US010717469B2

(12) United States Patent
Matsuoka et al.

(10) Patent No.: US 10,717,469 B2
(45) Date of Patent: Jul. 21, 2020

(54) VEHICLE BODY FRONT PART STRUCTURE

(71) Applicant: HONDA MOTOR CO., LTD., Tokyo (JP)

(72) Inventors: Kiyohiko Matsuoka, Wako (JP); Tomohito Kamada, Wako (JP); Akira Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 16/312,184

(22) PCT Filed: Jun. 22, 2017

(86) PCT No.: PCT/JP2017/023071
§ 371 (c)(1),
(2) Date: Dec. 20, 2018

(87) PCT Pub. No.: WO2017/222020
PCT Pub. Date: Dec. 28, 2017

(65) Prior Publication Data
US 2019/0233016 A1   Aug. 1, 2019

(30) Foreign Application Priority Data
Jun. 24, 2016   (JP) .................................. 2016-125679

(51) Int. Cl.
B62D 21/15   (2006.01)
B62D 25/20   (2006.01)
(Continued)

(52) U.S. Cl.
CPC ............ B62D 21/155 (2013.01); B60R 19/18 (2013.01); B62D 21/00 (2013.01); B62D 25/08 (2013.01);
(Continued)

(58) Field of Classification Search
CPC ...... B62D 21/155; B62D 21/00; B62D 25/08; B62D 25/20; B60R 19/18; B60R 2019/1806
See application file for complete search history.

(56) References Cited

U.S. PATENT DOCUMENTS

2012/0248819 A1* 10/2012 Okamura ................ B60R 19/12
296/187.1
2013/0161979 A1    6/2013 Abe et al.
(Continued)

FOREIGN PATENT DOCUMENTS

EP           2738047 A1    6/2014
JP        2009-096314 A    5/2009
(Continued)

OTHER PUBLICATIONS

International Search Report by ISA/JP dated Sep. 19, 2017, on PCT/JP2017/023071 (5 pages).
(Continued)

Primary Examiner — Lori L Lyjak
(74) Attorney, Agent, or Firm — Rankin, Hill & Clark LLP

(57) ABSTRACT

A vehicle body front part structure includes: a pair of left and right front side frames extending in the vehicle front-rear direction; and a front bulkhead connected to front ends of the front side frames. The front bulkhead includes: a pair of upper and lower lateral members extending in the left-right direction; and a pair of left and right vertical members extending in the up-down direction so as to connect ends on the outer sides in the vehicle width direction of the lateral members to each other. A forward extension part extending toward the front of the vehicle is provided at a lower end of the vertical member. A first load transmission member located on a more outer side in the vehicle width direction than the front side frame is fixed to the forward extension part.

14 Claims, 17 Drawing Sheets

(51) Int. Cl.
    *B62D 25/08*  (2006.01)
    *B62D 21/00*  (2006.01)
    *B60R 19/18*  (2006.01)

(52) U.S. Cl.
    CPC ...... *B62D 25/20* (2013.01); *B60R 2019/1806* (2013.01)

(56) References Cited

U.S. PATENT DOCUMENTS

| | | |
|---|---|---|
| 2013/0256051 A1 | 10/2013 | Nakamura et al. |
| 2015/0360632 A1 | 12/2015 | Nishida et al. |

FOREIGN PATENT DOCUMENTS

| | | |
|---|---|---|
| JP | 2009-096379 A | 5/2009 |
| JP | 2013-133031 A | 7/2013 |
| JP | 2013-212757 A | 10/2013 |
| WO | 2013018409 A1 | 2/2013 |
| WO | 2014115580 A1 | 7/2014 |
| WO | 2014125723 A1 | 8/2014 |

OTHER PUBLICATIONS

Written Opinion by ISA/JP dated Sep. 19, 2017, on PCT/JP2017/023071 (7 pages).

\* cited by examiner ial FIELD

VEHICLE BODY FRONT PART STRUCTURE

TECHNICAL FIELD

The present invention relates to a vehicle body front part structure.

BACKGROUND ART

There has heretofore been developed a technology to absorb collision energy by transmitting collision load to front side frames constituting the framework of a vehicle body in the event of small overlap collision where a collision object such as an oncoming car collides at a position on a more outer side in a vehicle width direction than the front side frames.

For example, Patent Literature 1 discloses an invention in which a protrusion part protruding outward in a vehicle width direction is provided on an outer surface of a front side frame. According to the invention of Patent Literature 1, in the event of small overlap collision, the protrusion part can transmit collision load to the front side frame to induce deformation of the front side frame, thereby absorbing collision energy.

CITATION LIST

Patent Literature

Patent Literature 1: Japanese Unexamined Patent Application Publication No. 2013-212757

SUMMARY OF INVENTION

Technical Problem

In order to promptly transmit the collision load to the front side frame, it is desirable to dispose a load transmission member as close to the front of the vehicle as possible. However, in the invention of Patent Literature 1, a crash can that absorbs collision energy in the event of front collision of the vehicle is disposed on the front surface of the front side frame. For this reason, it is difficult to dispose the load transmission member in front of the front side frame.

In consideration of the above problem, it is an object of the present invention to provide a vehicle body front part structure that can promptly transmit collision load to front side frames in the event of small overlap collision.

Solution to Problem

In order to achieve the above object, the present invention provides a vehicle body front part structure including: a pair of left and right front side frames extending in a vehicle front-rear direction; and a front bulkhead connected to front ends of the front side frames, wherein the front bulkhead includes a pair of upper and lower lateral members extending in a left-right direction and a pair of left and right vertical members extending in an up-down direction so as to connect ends, on the outer side in a vehicle width direction, of the lateral members. Forward extension parts extending toward the front of the vehicle are provided at lower ends of the vertical members. Load transmission members located on the outer side in the vehicle width direction than the front side frame are fixed to the forward extension parts.

According to the present invention, the forward extension part extending toward the front of the vehicle is provided at the lower end of the vertical member of the front bulkhead connected to the front end of the front side frame. Also, the load transmission member is fixed to the forward extension part. Therefore, the load transmission member is disposed closer to the front of the vehicle than the front side frame. Accordingly, in the event of small overlap collision, a collision object hits against the load transmission member sooner than the conventional technology in which the front side frame and the load transmission member are located at the same position in the vehicle front-rear direction. Therefore, collision load can be transmitted promptly to the front side frame through the vertical member. As a result, the front side frame can be promptly deformed, and collision energy can be quickly absorbed.

Preferably, the load transmission members each include a front end and an inclined surface that is continuous, on the outer side in the vehicle width direction, with the front end, and is inclined outward in the vehicle width direction from front to rear of the vehicle.

With this configuration, the front end and the inclined surface can come into contact with the collision object. Accordingly, a contact area can be increased, and thus the collision load can be favorably transmitted to the front side frame.

Preferably, the present invention further includes front subframes disposed below the front side frames and behind the load transmission members, and the front subframes include a pair of left and right longitudinal frames extending in the vehicle front-rear direction. In this case, the load transmission members preferably include locking parts located on the outer side, in the vehicle width direction, of front ends of the longitudinal frames.

With this configuration, the locking part of the first load transmission member is located on the outer side, in the vehicle width direction, of the front end of the longitudinal frame. Thus, the front end of the longitudinal frame can be prevented from opening outward in the vehicle width direction in the event of full flat collision.

Preferably, first joining flanges fixed to side walls, on the outer side in the vehicle width direction, of the vertical members are formed in the load transmission members, and second joining flanges fixed to side walls, on the inner side in the vehicle width direction, of the vertical members are formed at the ends, on the outer side in the vehicle width direction, of the lateral members.

With this configuration, since the outer and inner surfaces of the vertical member both have the flanges fixed thereto, stiffness balance therebetween is equalized. This makes it unlikely for the vertical member to collapse in the event of small overlap collision. As a result, the collision load can be favorably transmitted to the front side frame.

Preferably, the vertical members have its lower end inserted into the ends, on the outer side in the vehicle width direction, of the lateral members and fixed therein.

With this configuration, the lower end of the vertical member is inserted into the end, on the outer side in the vehicle width direction, of the lateral member and fixed therein. Thus, the stiffness of the lower end of the vertical member, which serves as the fixing part for the load transmission member, can be improved. This makes it unlikely for the vertical member to collapse in the event of small overlap collision. As a result, the collision load can be favorably transmitted to the front side frame.

Preferably, the present invention further includes supporting members configured to support front ends of the front subframes with respect to lower surfaces of the front ends of the front side frames and located behind the forward extension parts. In this case, bulging parts bulging toward the front of the vehicle along rear surfaces of the forward extension parts are preferably formed on front walls of the supporting members.

With this configuration, when a foot sweep member for a pedestrian's leg is provided on the front surface of the lower end of the vertical member or the front surface of the lower lateral member, load from the foot sweep member can be quickly supported.

Preferably, the vertical member includes a hollow part that is continuous in the up-down direction, and a central part, in the up-down direction, of the hollow part is biased inward in the vehicle width direction. In this case, a vehicle body mounting seat attached to the front end of the front side frame is preferably formed on the outer side, in the vehicle width direction, of the central part.

With this configuration, the vertical member includes the hollow part that is continuous in the up-down direction. Thus, the strength and stiffness of the vertical member can be improved. The vehicle body mounting seat is formed such that the central part, in the up-down direction, of the hollow part is biased inward in the vehicle width direction. Thus, crash cans (bumper beam extensions) can be installed at the front ends of the front side frames with the vehicle body mounting seat sandwiched therebetween. Accordingly, the load transmission member can be disposed on the outer side in the vehicle width direction than the front side frame to deal with the small overlap collision while securing the installation space for the crash can. Moreover, the front bulkhead can be assembled to the front side frames from the front of the vehicle, and thus assembly workability is improved.

Preferably, the present invention further includes an intercooler mounting bracket fixed to the lower lateral member, and the lower lateral member is a hollow member including a main body member having a hat shape in cross section with a top opening and a cover member covering the top opening of the main body member. In this case, the intercooler mounting bracket is preferably fixed to a flange part of the main body member and a vertical part adjacent to the flange part.

With this configuration, the intercooler mounting bracket is fixed to the flange part of the main body member and the vertical part adjacent to the flange part, respectively. Thus, the connection between the flange part and the vertical part can be improved. At the same time, the stiffness of the bracket itself can also be improved because of its bracket shape that can be fixed to the flange part and the vertical part. Accordingly, idling vibration transmitted through an intercooler can be suppressed.

Advantageous Effects of Invention

The vehicle body front part structure according to the present invention makes it possible to promptly transmit collision load to front side frames in the event of small overlap collision.

DESCRIPTION OF EMBODIMENTS

Figure 1:
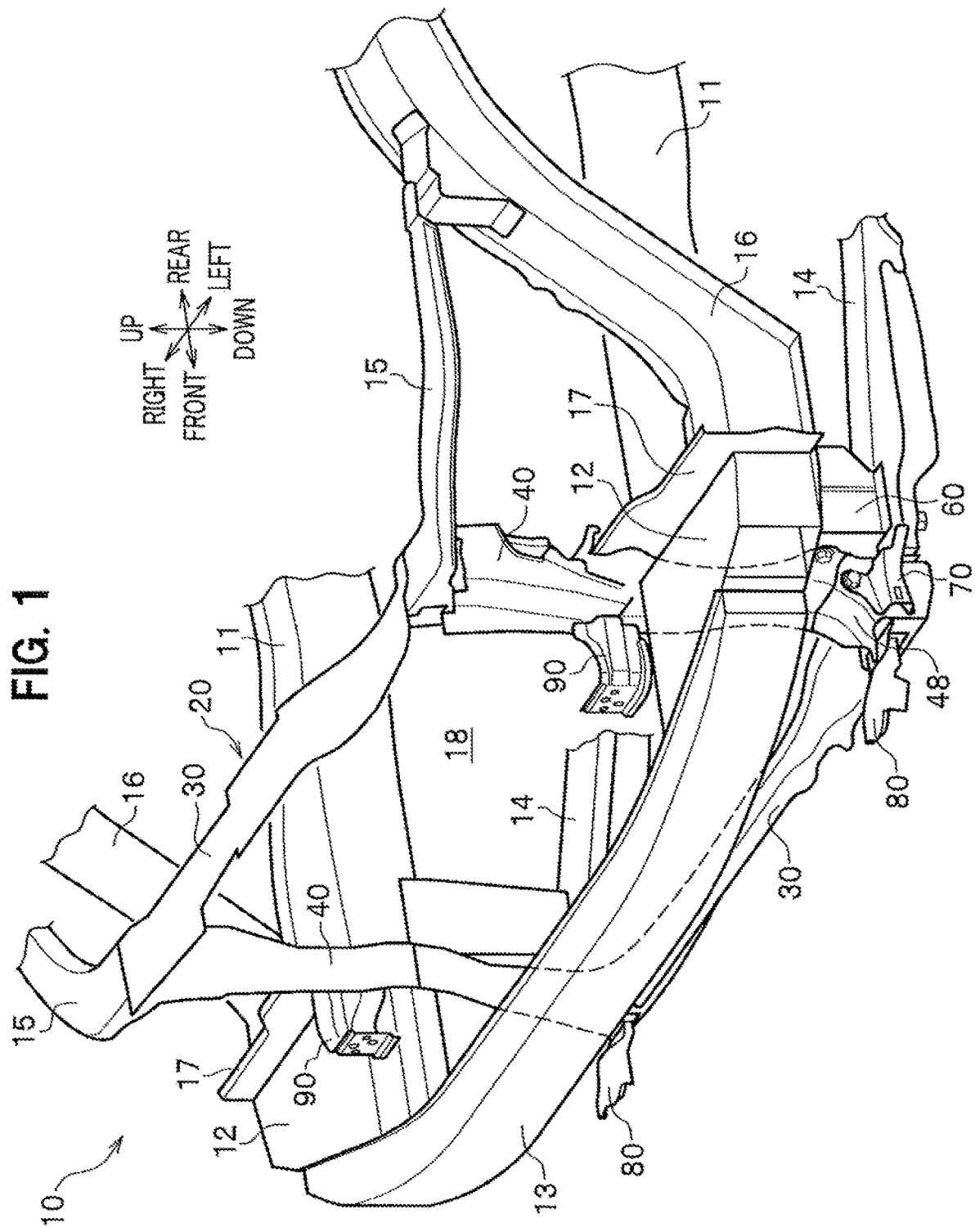
FIG. 1 is a perspective view of a vehicle body front part of a vehicle to which a vehicle body front part structure according to an embodiment of the present invention is applied.

Embodiments of the present invention will be hereinafter described in detail with reference to the drawings as necessary. Note that "front-rear" and "up-down" indicated by the arrows in the drawings represent a vehicle body front-rear direction and a vehicle body up-down direction, and "left-right" represents a left-right direction (vehicle width direction) when viewed from a driver's seat. Moreover, in this embodiment, a longitudinal section refers to a vertical section, while a traverse section refers to a horizontal section.

First, description is given of an overall configuration of a vehicle 10 to which a vehicle body front part structure of the present invention is applied.

As shown in FIG. 1, the vehicle 10 includes: a pair of left and right front side frames 11, 11 extending in the vehicle front-rear direction; and bumper beam extension 12, 12 attached to front ends of the left and right front side frames 11, 11, respectively, with attachment plates 17, 17 interposed therebetween. The vehicle 10 also includes: a front bumper beam 13 mounted on the left and right bumper beam extensions 12, 12; and front subframes 14 provided below the front side frames 11, 11.

The vehicle 10 further includes: a front bulkhead 20 provided on the inside of the left and right bumper beam extensions 12, 12; left and right upper members 15, 15 supporting upper ends of the front bulkhead 20; and left and right lower members 16, 16 connected to rear ends of the bumper beam extensions 12 on the vehicle outside of the front side frames 11.

A space surrounded by the front side frames 11, the front bulkhead 20, and the like serves as a motor room 18 in which a power unit 140 (see FIG. 16) including an engine, a transmission, and the like is disposed. On lateral surfaces of the front ends of the front side frames 11, gussets 19 (see FIG. 16) are provided bulging outward in the vehicle width direction. The gussets 19 connect the front side frames 11 to the bumper beam extensions 12. The gussets 19 each have a triangular shape in a bottom view, which spreads outward in the vehicle width direction toward the front of the vehicle.

Next, a configuration of the front bulkhead 20 will be described in detail.

The front bulkhead 20 is a metal member having a rectangular frame shape in a front view. The front bulkhead 20 includes: a pair of upper and lower lateral members 30, 30 extending in the left-right direction; and a pair of left and right vertical members 40, 40 extending in the up-down direction so as to connect respective ends, on the outer side in the vehicle width direction, of the lateral members 30, 30.

Figure 2:
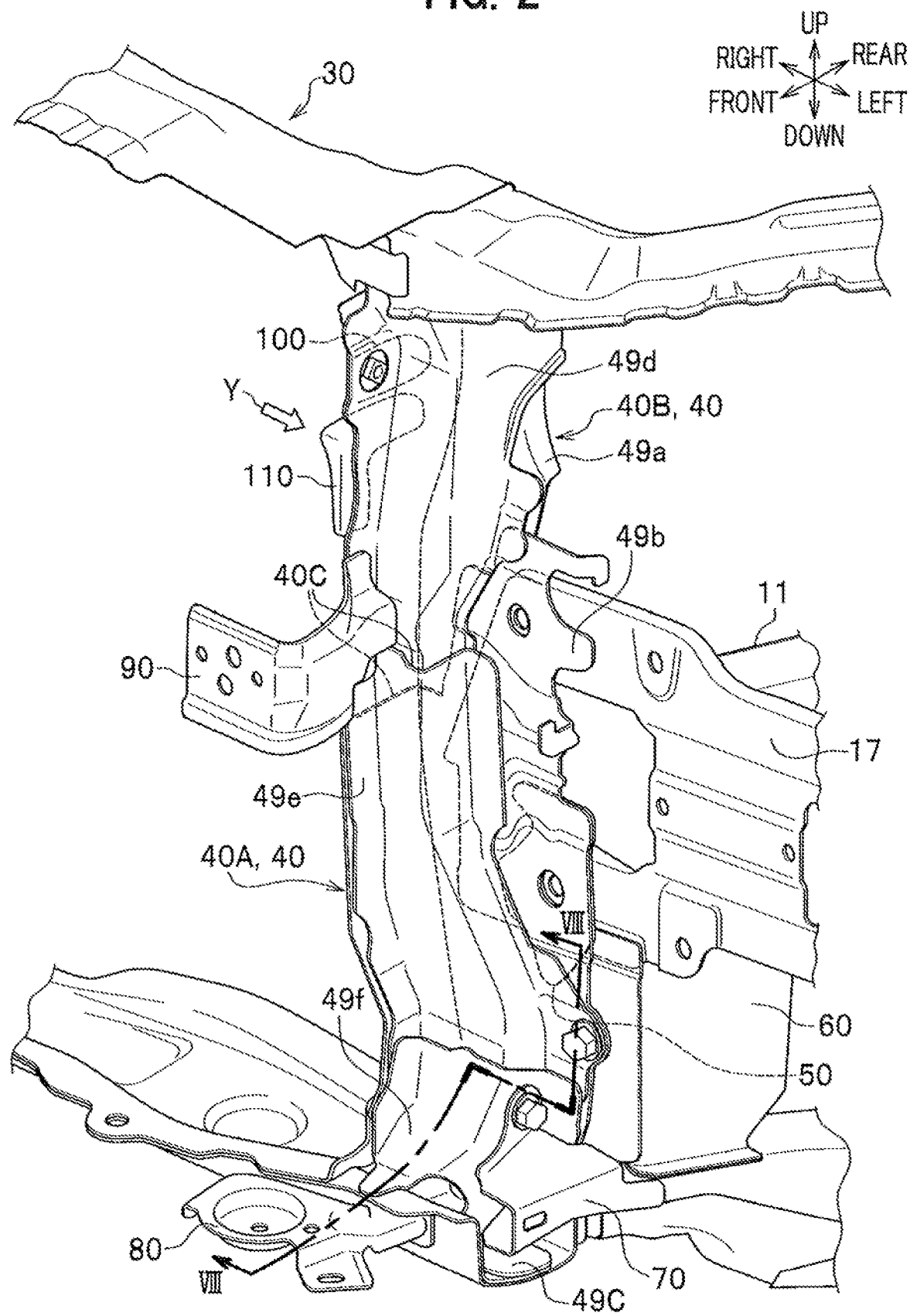
FIG. 2 is a perspective view seen obliquely downward from the left front, showing the left side of a front bulkhead.

As shown in FIG. 2, a reinforcing member 50 and a supporting member 60 are attached to a rear end of each of the vertical members 40, and a first load transmission member 70 and an intercooler mounting bracket 80 are attached to a lower end of the vertical member 40. A second load transmission member 90, a collision detection sensor 100, and a protector 110 are attached to the upper half of the vertical member 40. The respective members will be described in detail later.

Figure 3:
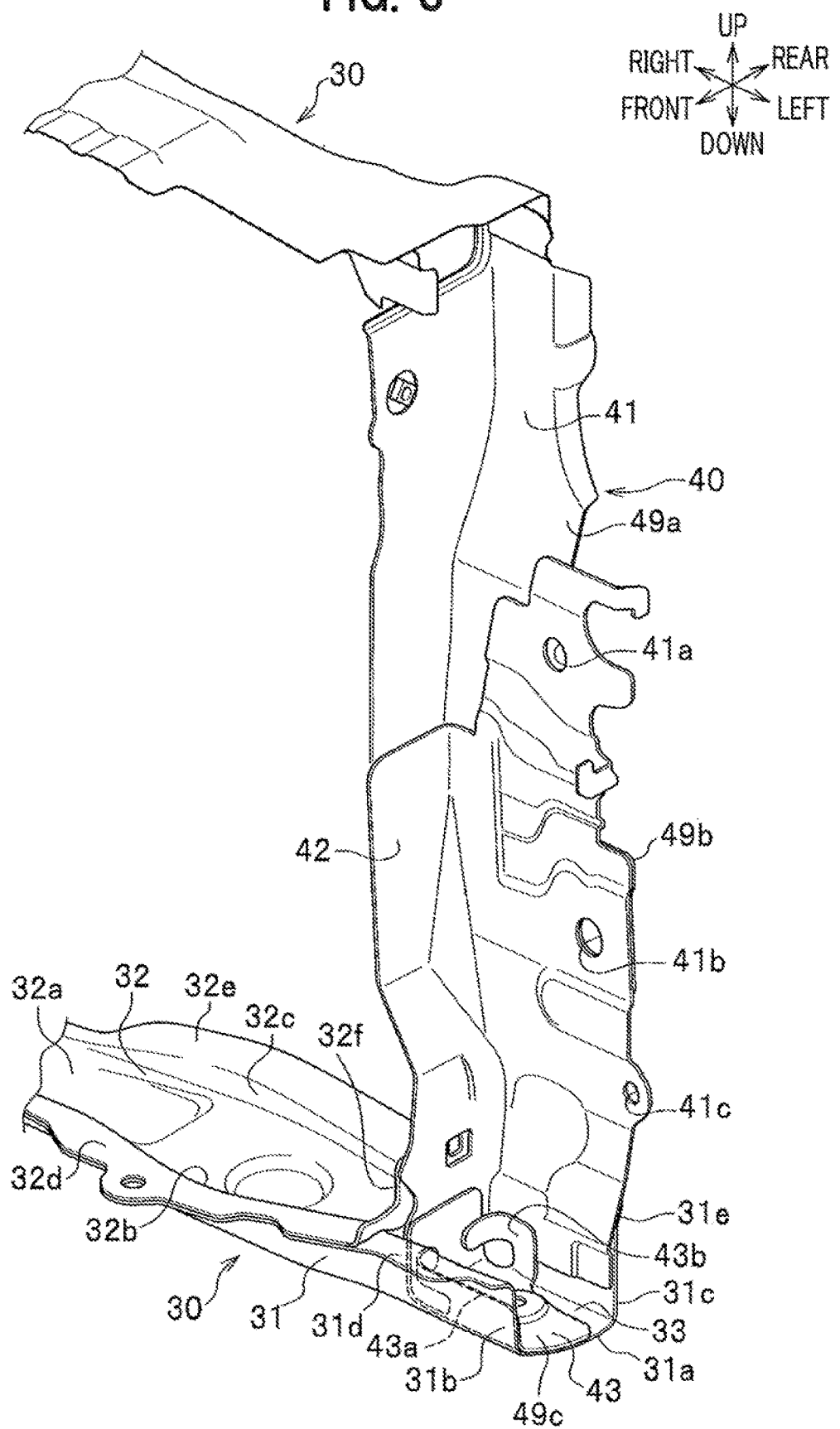
FIG. 3 is a perspective view showing first to third plate bodies of a vertical member.

As shown in FIG. 3, the lateral member 30 is a member formed by joining a main body member 31 and a cover member 32 by welding, which are formed by pressing metal plates, respectively. The main body member 31 has a hat shape with a top opening in a longitudinal section view along the vehicle front-rear direction. On the outer side, in the vehicle width direction, of the main body member 31, an open section part 33 is formed, which is not covered with the cover member 32 and has its top open.

The main body member 31 includes: a main body bottom wall 31*a* extending in the vehicle front-rear direction and in the vehicle width direction; a main body front wall 31*b* extending upward from a front edge of the main body bottom wall 31*a*; and a main body rear wall 31*c* extending upward from a rear edge of the main body bottom wall 31*a*. The main body member 31 also includes: a main body front flange 31*d* extending toward the front of the vehicle from an upper edge of the main body front wall 31*b*; and a main body rear flange 31*e* extending toward the rear of the vehicle from an upper edge of the main body rear wall 31*c*. The main body front wall 31*b* constitutes a vertical part in the claims.

The cover member 32 is a member that partially covers the top opening of the main body member 31 from above. The cover member 32 has a hat shape with its top open, which matches the shape of the main body member 31. More specifically, the cover member 32 includes: a cover bottom wall 32*a* extending in the vehicle front-rear direction and in the vehicle width direction; a cover front wall 32*b* extending upward from a front edge of the cover bottom wall 32*a*; a cover rear wall 32*c* extending upward from a rear edge of the cover bottom wall 32*a*; a cover front flange 32*d* extending toward the front of the vehicle from an upper edge of the cover front wall 32*b*; and a cover rear flange 32*e* extending toward the rear of the vehicle from an upper edge of the cover rear wall 32*c*.

The cover front flange 32*d* is connected by welding to the upper surface of the main body front flange 31*d*. The cover rear flange 32*e* is connected by welding to the upper surface of the main body rear flange 31*e*. An upward extending joining flange 32*f* is formed at the end, on the outer side in the vehicle width direction, of the cover member 32. The joining flange 32*f* is connected by welding to a vehicle inner wall 42 of the vertical member 40. The joining flange 32*f* constitutes a second joining flange in the claims.

Figure 4:
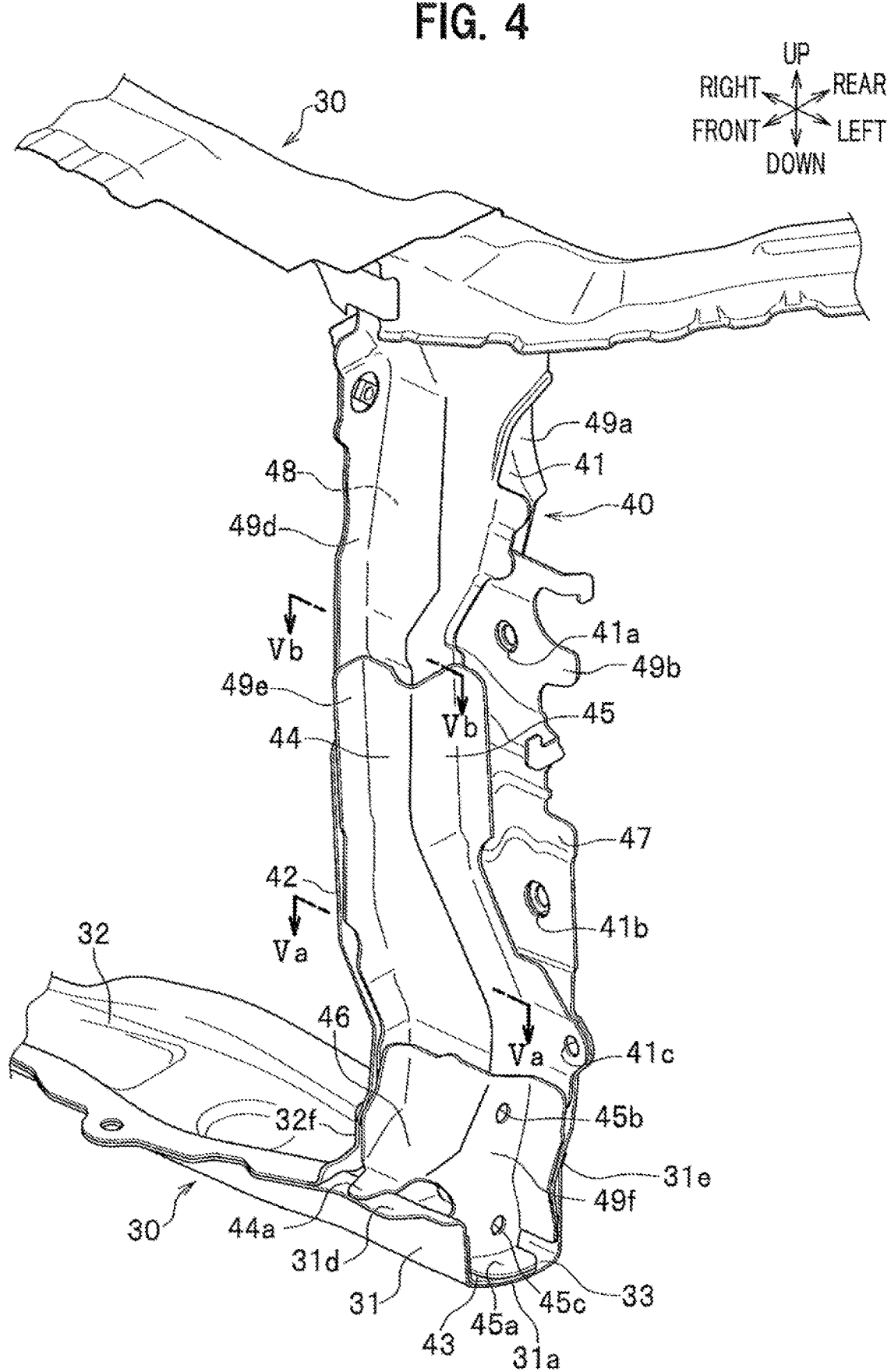
FIG. 4 is a perspective view showing a state where fourth to sixth plate bodies are assembled to the vertical member shown in FIG. 3.

As shown in FIGS. 3 and 4, the vertical member 40 is a hollow member formed by connecting by welding a plurality of (six in this embodiment) first to sixth plate bodies 49*a* to 49*f* formed by pressing metal plates. The plate bodies 49*a* to 49*f* each have an approximately L-shape in a cross-sectional view. The plate bodies 49*a* to 49*f* are assembled by connecting walls and edges thereof to each other. The vertical member 40 includes a rear side wall 41, the vehicle inner wall 42, a bottom wall 43, a front side wall 44, a vehicle outer wall 45, a forward extension part 46, a vehicle body mounting seat 47, and a hollow part 48.

As shown in FIG. 3, the rear side wall 41 mainly includes the first and second plate bodies 49*a* and 49*b*, and is a wall part extending in the vehicle width direction and in the up-down direction. The rear side wall 41 has its upper end extending to above the vehicle inner wall 42 and connected by welding to the lateral member 30 thereabove. The rear side wall 41 has its lower end extending to the inside of the open section part 33. The rear side wall 41 has a plurality of (three in this embodiment) through-holes 41*a* to 41*c* formed therein. The through-holes 41*a* to 41*c* are provided at intervals in the up-down direction.

The vehicle inner wall 42 mainly includes the first and second plate bodies 49*a* and 49*b*, and is a wall part extending in the vehicle front-rear direction and up-down direction. The vehicle inner wall 42 has its lower end extending to a position overlapping with the joining flange 32*f* in the vehicle width direction.

The bottom wall 43 mainly includes the third plate body 49*c*, and is a wall part extending in the vehicle front-rear direction and in the vehicle width direction. The bottom wall 43 is disposed inside the open section part 33. The bottom wall 43 is connected by welding to the upper surface of the main body bottom wall 31*a*. At front and rear edges of the bottom wall 43, a front flange 43*a* and a rear flange 43*b*, which stand upright, are formed, respectively. The front flange 43*a* is connected by welding to the rear surface of the main body front wall 31*b*. The rear flange 43*b* is connected by welding to the front surface of the main body rear wall 31*c* with the rear side wall 41 interposed therebetween.

As shown in FIG. 4, the front side wall 44 mainly includes the fourth to sixth plate bodies 49*d* to 49*f*, and is a wall part extending in the vehicle width direction and in the up-down direction. A front flange 44*a* extending toward the front of the vehicle is formed at a lower end of the front side wall 44. The front flange 44*a* is connected by welding to the upper surface of the main body front flange 31*d*.

The vehicle outer wall 45 mainly includes the fourth to sixth plate bodies 49*d* to 49*f*, and is a wall part extending in the vehicle front-rear direction and up-down direction. The vehicle outer wall 45 has its lower end extending to the inside of the open section part 33. An outer flange 45*a* extending outward in the vehicle width direction is formed at a lower end of the vehicle outer wall 45. The outer flange 45*a* is connected by welding to the upper surface of the main body bottom wall 31*a* with the bottom wall 43 interposed therebetween. A plurality of (two in this embodiment) through-holes 45*b* and 45*c* are formed in the lower end of the vehicle outer wall 45. The through-holes 45*b* and 45*c* are provided at an interval in the up-down direction.

The forward extension part 46 is provided at the lower end of the vertical member 40, and is curved (bent) so as to extend toward the front of the vehicle. The forward extension part 46 is formed by bending (curving) the lower ends of the front side wall 44, the vehicle outer wall 45, and the rear side wall 41 toward the front of the vehicle gradually from top to bottom as a whole. The forward extension part 46 extends most toward the front of the vehicle in the vertical member 40.

The vehicle body mounting seat 47 is provided in a part, on the outer side of the vehicle, of the rear side wall 41, and is a part to which the front side frame 11 is attached. Among the through-holes 41a to 41c formed in the rear side wall 41, the two through-holes 41a and 41b are located in the vehicle body mounting seat 47.

The vehicle body mounting seat 47 will be described in more detail. A central part, in the up-down direction, of the rear side wall 41 (a part overlapping with a mounting plate 17 in the front-rear direction) extends in the up-down direction with an approximately constant width. Central parts, in the up-down direction, of the front side wall 44 and the vehicle outer wall 45 (parts overlapping with the mounting plate 17 in the front-rear direction) extends approximately linearly upward after sloping inward in the vehicle width direction from bottom to top. Thus, the vehicle body mounting seat 47 exposed while extending to the outer side of the vehicle than the vehicle outer wall 45 (hollow part 48) is formed in a part, on the outer side of the vehicle, of the rear side wall 41. Meanwhile, a central part, in the up-down direction, of the hollow part 48 is biased inward in the vehicle width direction at a position overlapping with the mounting plate 17 in the front-rear direction.

Here, with reference to FIGS. 2 and 5, the vertical member 40 will be described in more detail.

As shown in FIG. 2, in terms of a difference in stiffness against collision load, the vertical member 40 is divided into a lower vertical member 40A disposed on the lower side and an upper vertical member 40B disposed above the lower vertical member 40A. More specifically, the vertical member 40 is formed by connecting the lower vertical member 40A, which is supported from the rear side of the vehicle by the front side frame 11 and thus has high stiffness against the collision load, to the upper vertical member 40B, which is not supported by the front side frame 11 and thus has low stiffness against the collision load.

The lower vertical member 40A includes: the second plate body 49b fixed directly to the front side frame 11; the fifth plate body 49e disposed in approximately the same position, in the up-down direction, as the second plate body 49b; and the third and sixth plate bodies 49c and 49f disposed below the second plate body 49b. The upper vertical member 40B includes the first and fourth plate bodies 49a and 49d disposed above the second plate body 49b. A boundary part 40C between the lower vertical member 40A and the upper vertical member 40B functions as a folding part (fragile part) in the event of front collision of the vehicle 10.

Figure 5A:
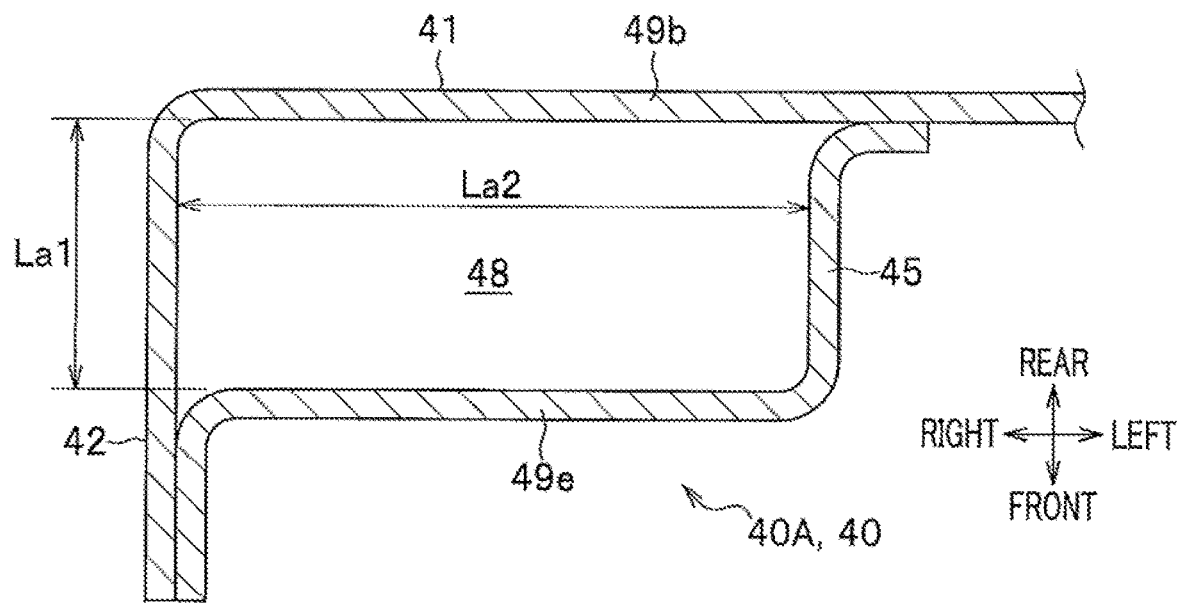
FIG. 5A is a cross-sectional view taken along the line Va-Va in FIG. 4
Figure 5B:
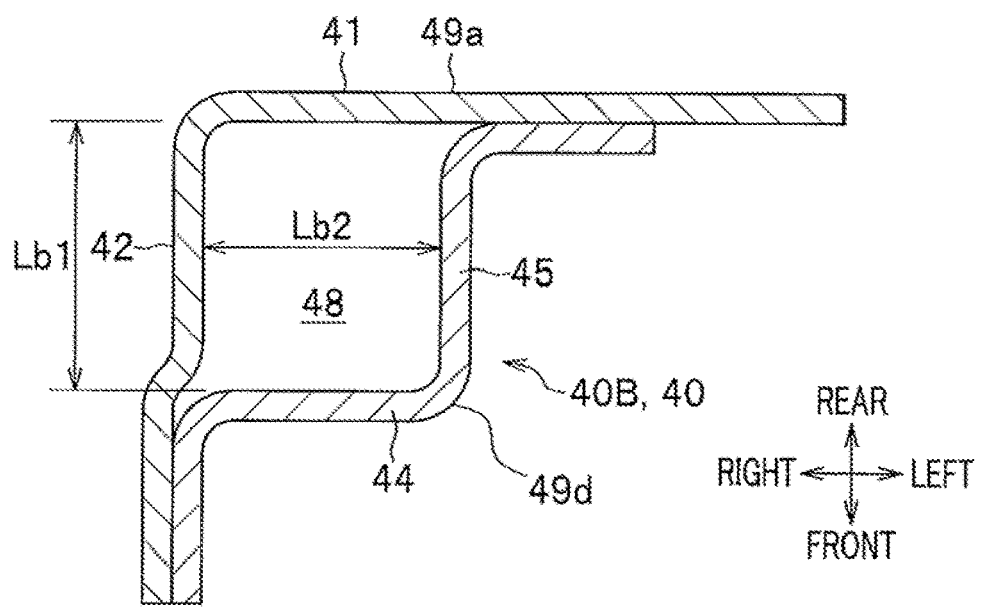
FIG. 5B is a cross-sectional view taken along the line Vb-Vb in FIG. 4.

As shown in FIGS. 5A and 5B, the vertical member 40 includes the hollow part 48 that is continuous in the up-down direction. The hollow part 48 is formed into a square cylindrical shape. The hollow part 48 on the lower vertical member 40A side shown in FIG. 5A is formed by being surrounded by the second and fifth plate bodies 49b and 49e. A dimension La1, in the vehicle front-rear direction, of the hollow part 48 on the lower vertical member 40A side is approximately constant across the vehicle width direction. A dimension La2, in the vehicle width direction, of the hollow part 48 on the lower vertical member 40A side is approximately constant across the vehicle front-rear direction.

The hollow part 48 on the upper vertical member 40B side shown in FIG. 5B is formed by being surrounded by the first and fourth plate bodies 49a and 49d. A dimension Lb1, in the vehicle front-rear direction, of the hollow part 48 on the upper vertical member 40B side is approximately constant across the vehicle width direction. A dimension Lb2, in the vehicle width direction, of the hollow part 48 on the upper vertical member 40B side is approximately constant across the vehicle front-rear direction.

The dimension Lb1, in the vehicle front-rear direction, of the hollow part 48 on the upper vertical member 40B side is set the same or approximately the same as the dimension La1, in the vehicle front-rear direction, of the hollow part 48 on the lower vertical member 40A side. The dimension Lb2, in the vehicle width direction, of the hollow part 48 on the upper vertical member 40B side is set smaller than the dimension La2, in the vehicle width direction, of the hollow part 48 on the lower vertical member 40A side. Therefore, a hollow cross-sectional area orthogonal to the extending direction of the upper vertical member 40B is set smaller than a hollow cross-sectional area orthogonal to the extending direction of the lower vertical member 40A. Note that the hollow cross-sectional area of the upper vertical member 40B may be reduced by adjusting at least one of the dimensions La1 and Lb1 along the vehicle front-rear direction and the dimensions La2 and Lb2 along the vehicle width direction.

Figure 6:
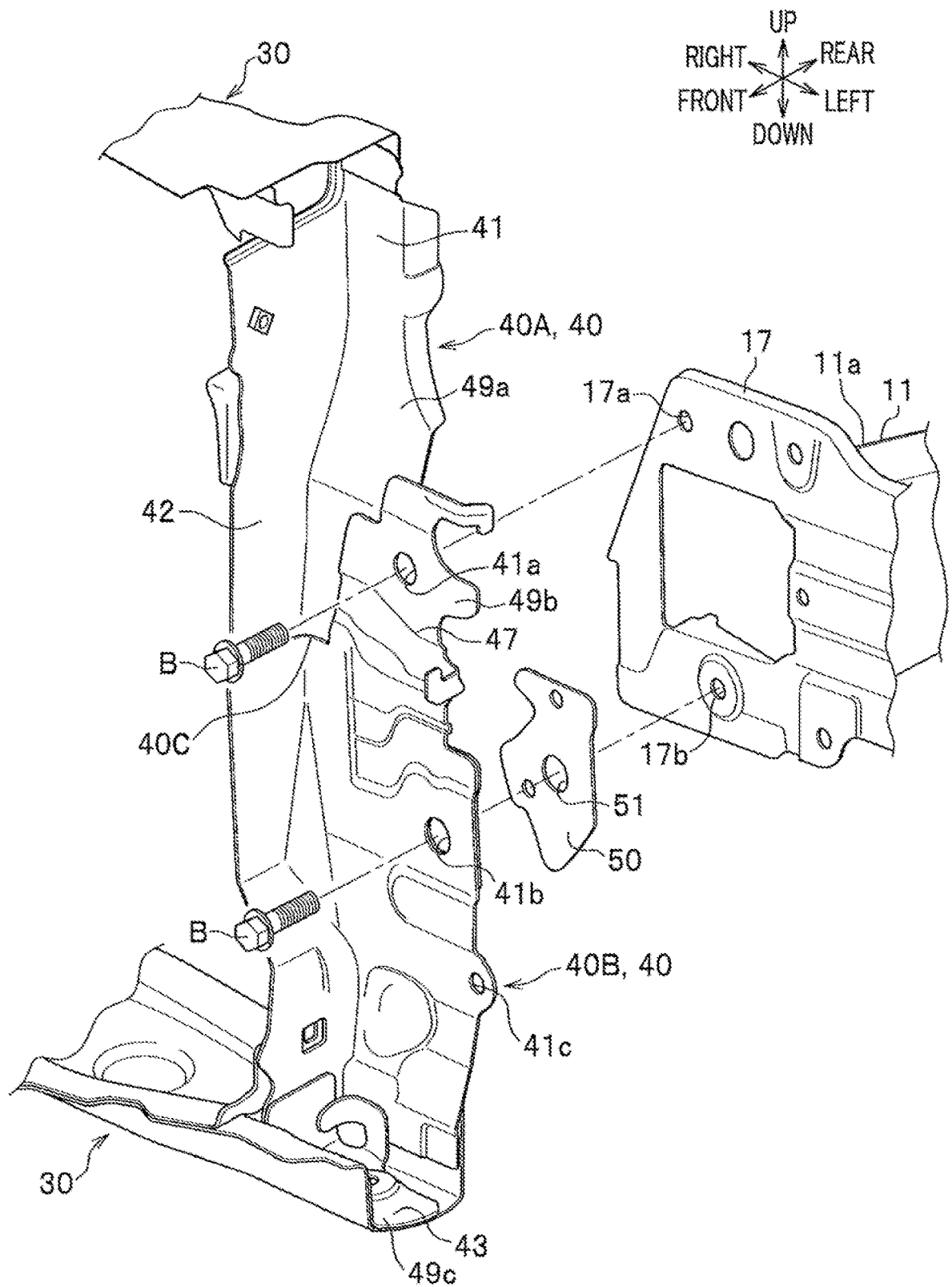
FIG. 6 is an exploded perspective view showing the vertical member, a mounting plate, and a reinforcing member.

Next, with reference to FIG. 6, the mounting plate 17 and the reinforcing member 50 will be described in detail.

The mounting plate 17 is a plate-like member provided at a front end 11a of the front side frame 11. The mounting plate 17 is formed into a predetermined complex shape by making bends and notches in a metal plate. The mounting plate 17 has through-holes 17a and 17b formed therein, which are communicated with the through-holes 41a and 41b in the vehicle body mounting seat 47.

The reinforcing member 50 is a plate-like member interposed between the mounting plate 17 and the vehicle body mounting seat 47. The reinforcing member 50 is formed into a predetermined complex shape by making bends and notches in a metal plate. The reinforcing member 50 is disposed overlapping with the peripheries (peripheral edges) of the through-holes 41b in the vehicle body mounting seat 47 and of the through-holes 17b in the mounting plate 17. The reinforcing member 50 has a function to reinforce the peripheries of the through-holes 41b and 17b.

The reinforcing member 50 has a through-hole 51 formed therein, which is communicated with the through-holes 41b and 17b. A bolt B for connecting the vehicle body mounting seat 47, the reinforcing member 50, and the mounting plate 17 is inserted into the through-holes 41b, 51, and 17b. A fixing part for the vehicle body mounting seat 47, the reinforcing member 50, and the mounting plate 17 is located below the boundary part 40C and above the forward extension part 46. The fixing part is located near an intermediate part, in the up-down direction, of the lower vertical member 40A.

Next, with reference to FIGS. 7 and 8, the front subframe 14 and the supporting member 60 will be described in detail.

Figure 7:
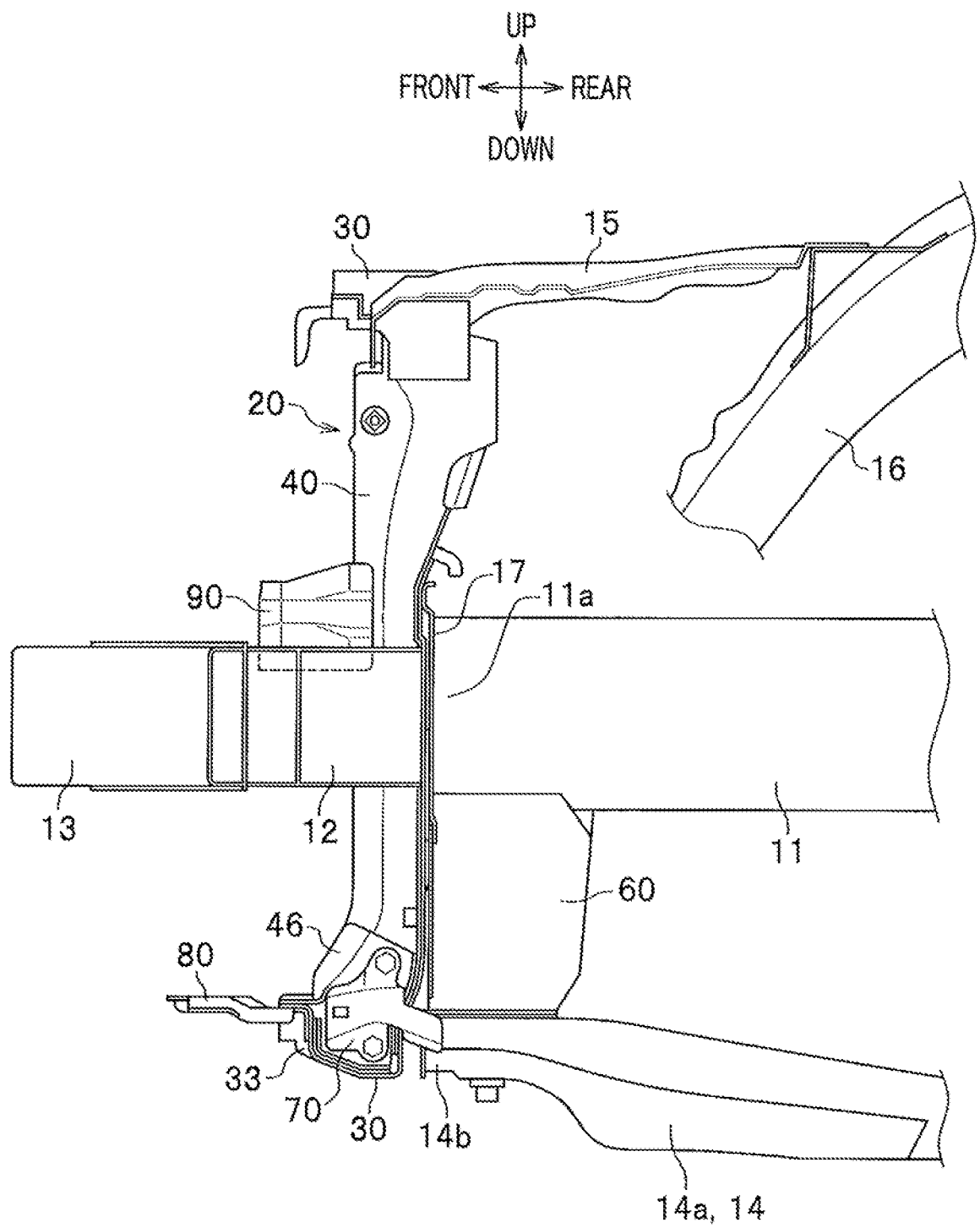
FIG. 7 is a left side view of the vehicle body front part.

As shown in FIG. 7, the front subframe 14 includes a pair of left and right longitudinal frames 14a extending in the vehicle front-rear direction (FIG. 7 shows only one thereof). The longitudinal frame 14a is disposed behind the forward extension part 46 and the open section part 33 in the vehicle front-rear direction. The longitudinal frame 14a is disposed below the front side frame 11 at a distance therefrom.

The supporting member 60 is a hollow member interposed between the longitudinal frame 14a and the front side frame 11. The supporting member 60 has a role of supporting a front end 14b of the longitudinal frame 14a with respect to the lower surface of the front end 11*a* of the front side frame 11. Although not shown, the supporting member 60 is formed by connecting by welding a plurality of plate bodies formed by pressing metal plates. The supporting member 60 is disposed behind the vertical member 40 in the vehicle front-rear direction.

Figure 8:
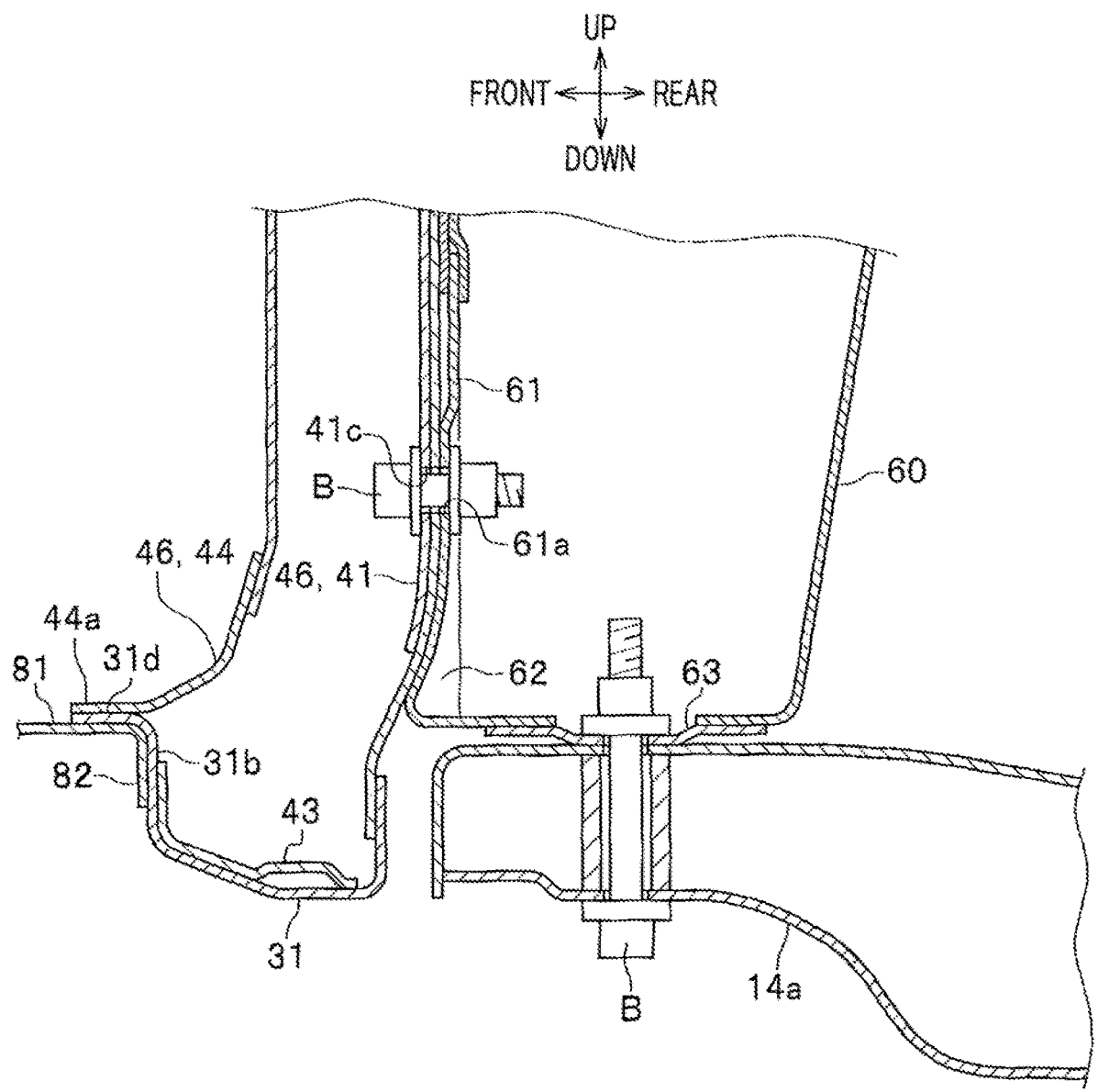
FIG. 8 is a cross-sectional view taken along the line VIII-VIII in FIG. 2.

As shown in FIG. 8, a bulging part 62 bulging toward the front of the vehicle is formed in a front wall 61 of the supporting member 60 facing the vertical member 40. The bulging part 62 is formed into a tapered shape along the shape of the rear surface (rear side wall 41) of the forward extension part 46. More specifically, the bulging amount of the bulging part 62 is gradually increased from top to bottom. The bulging part 62 is in contact with the rear surface of the forward extension part 46.

A through-hole 61*a* communicated with the through-hole 41*c* in the rear side wall 41 is formed in the front wall 61 of the supporting member 60. A bolt B for connecting the supporting member 60 and the rear side wall 41 is inserted into the through-holes 61*a* and 41*c*. The bottom wall 63 of the supporting member 60 is connected to the longitudinal frame 14*a* with a bolt B.

Next, with reference to FIGS. 9 to 11, the first load transmission member 70 and the intercooler mounting bracket 80 will be described in detail.

Figure 9:
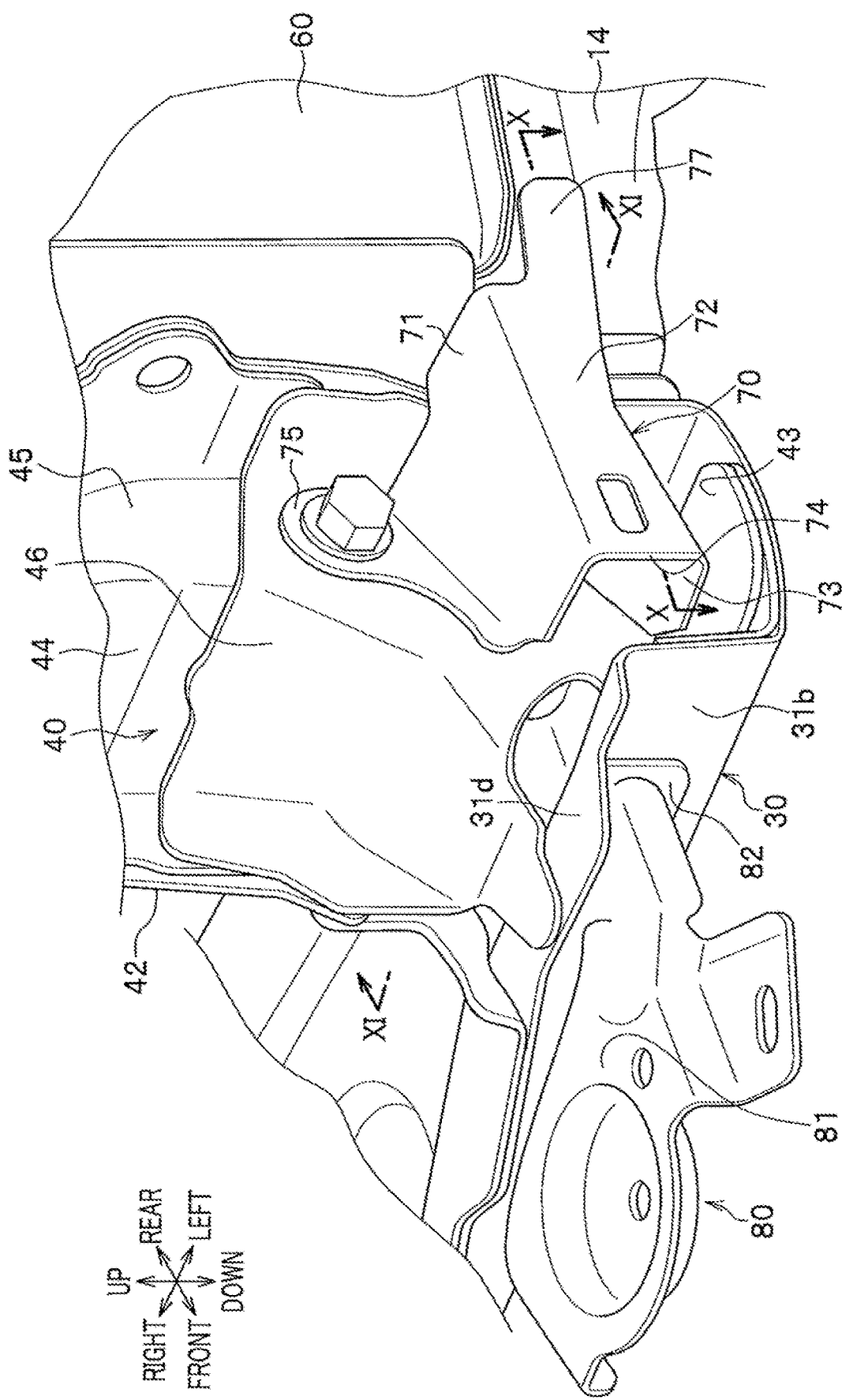
FIG. 9 is an enlarged perspective view of a first load transmission member and an intercooler mounting bracket.

As shown in FIG. 9, the first load transmission member 70 is located on the outer side in the vehicle width direction than the front side frame 11 (see FIG. 2 and the like), and is a member for transmitting collision load applied in the event of small overlap collision to the front side frame 11 through the vertical member 40. The first load transmission member 70 is formed into a predetermined complex shape by making bends and notches in a metal plate. The first load transmission member 70 is fixed to the outer surface (vehicle outer wall 45) of the forward extension part 46.

The first load transmission member 70 includes: an upper surface 71 extending in the vehicle front-rear direction and in the vehicle width direction; an inclined surface 72 extending downward from a vehicle outer edge of the upper surface 71; a lower surface 73 extending inward in the vehicle width direction from a lower edge of the inclined surface 72; and a front end 74 including front edges of the upper surface 71, the inclined surface 72, and the lower surface 73, and having a U-shape. The first load transmission member 70 also includes: an upper flange 75 extending upward from a vehicle inner edge of the upper surface 71; a lower flange 76 (see FIG. 11) extending downward from a vehicle inner edge of the lower surface 73; and a locking part 77 extending toward the rear of the vehicle from rear edges of the inclined surface 72 and the lower surface 73. Note that the shape of the front end 74 is not particularly limited, but the front end 74 may be formed into a rectangular surface shape covering an opening at the front edges of the upper surface 71, the inclined surface 72, and the lower surface 73, for example.

Figure 10:
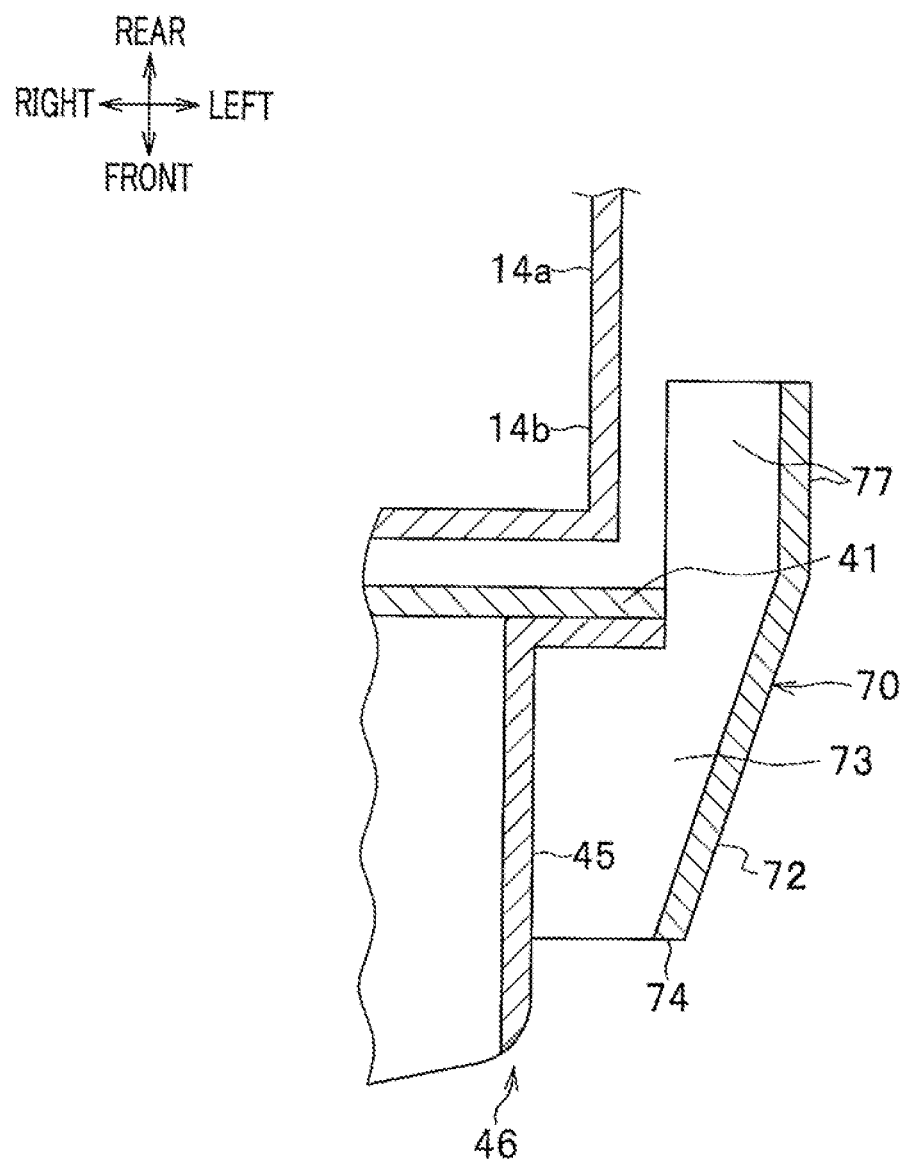
FIG. 10 is a cross-sectional view taken along the line X-X in FIG. 9.

As shown in FIG. 10, the inclined surface 72 is continuous, on the outer side in the vehicle width direction, with the front end 74, and is inclined outward in the vehicle width direction from front to rear of the vehicle. The front end 74 and the inclined surface 72 serve as an abutting surface (load receiving surface) that receives collision load in the event of small overlap collision. The locking part 77 is formed at the rear edges of the inclined surface 72 and the lower surface 73, and has an L-shape in a longitudinal section view along the vehicle width direction. The locking part 77 is located on the outer side, in the vehicle width direction, of the front end 14*b* of the longitudinal frame 14*a*.

Figure 11:
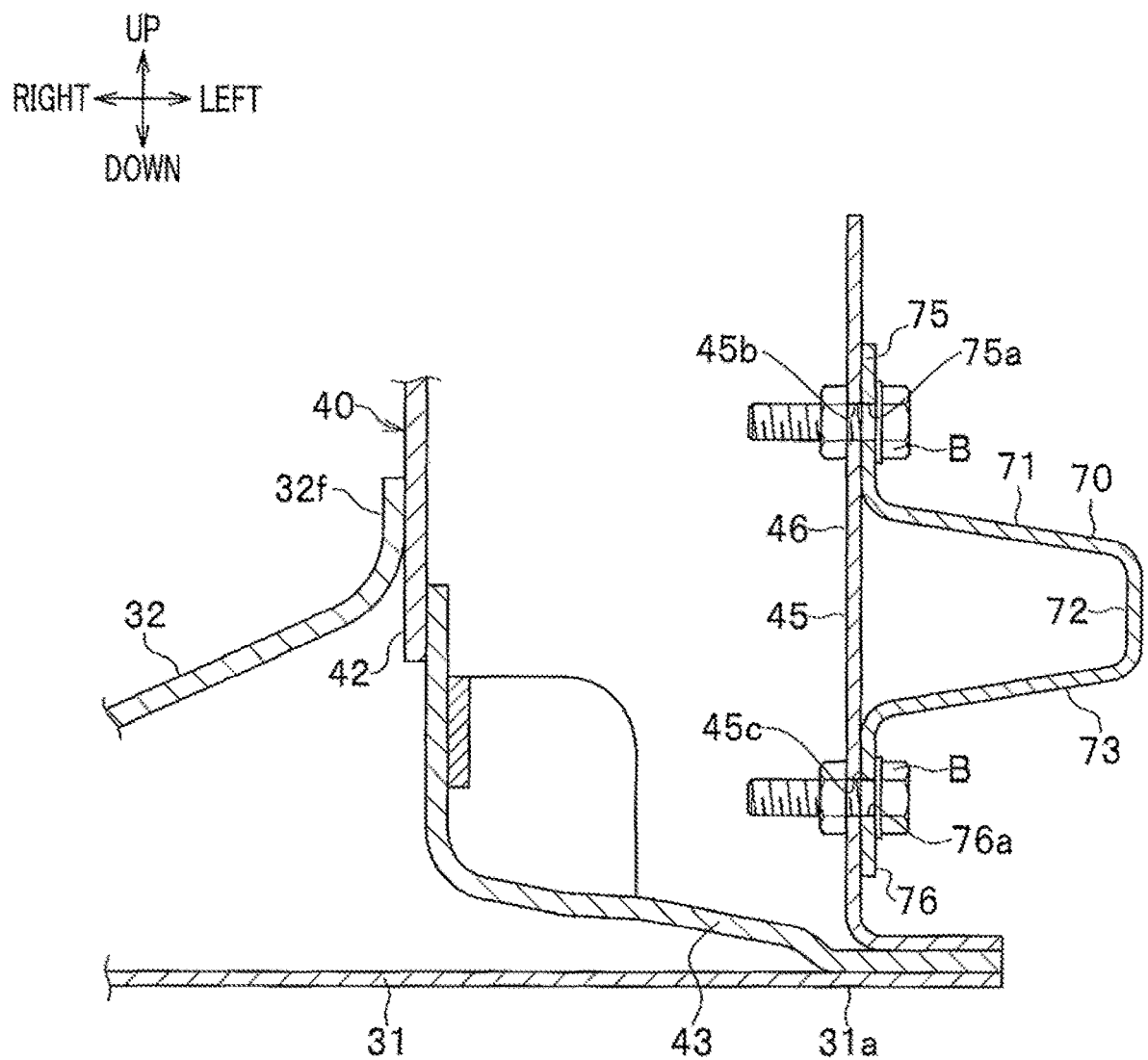
FIG. 11 is a cross-sectional view taken along the line XI-XI in FIG. 9.

As shown in FIG. 11, the upper flange 75 has a through-hole 75*a* formed therein, which is communicated with the through-hole 45*b* in the vehicle outer wall 45. The lower flange 76 has a through-hole 76*a* formed therein, which is communicated with the through-hole 45*c* in the vehicle outer wall 45. The upper and lower flanges 75 and 76 are fixed to the vehicle outer wall 45 with bolts B, B, respectively. The upper and lower flanges 75 and 76 constitute a first joining flange in the claims.

As shown in FIG. 9, the intercooler mounting bracket 80 is a member for mounting an unillustrated intercooler, and is fixed to an end, on the outer side in the vehicle width direction, of the lateral member 30. The intercooler mounting bracket 80 is formed into a predetermined complex shape by making bends and notches in a metal plate. The intercooler mounting bracket 80 includes: a mounting surface 81 extending in the vehicle front-rear direction and in the vehicle width direction and having the intercooler mounted thereon; and a rear flange 82 extending downward from a rear edge of the mounting surface 81.

The mounting surface 81 has its rear part connected by welding to the lower surface of the main body front flange 31*d* (see also FIG. 8). The rear flange 82 is connected by welding to the front surface of the main body front wall 31*b*. More specifically, the intercooler mounting bracket 80 is fixed to the main body front flange 31*d* and the main body front wall 31*b* adjacent to the main body front flange 31*d*.

Next, the second load transmission member 90 will be described in detail with reference to FIGS. 12 to 14.

Figure 12:
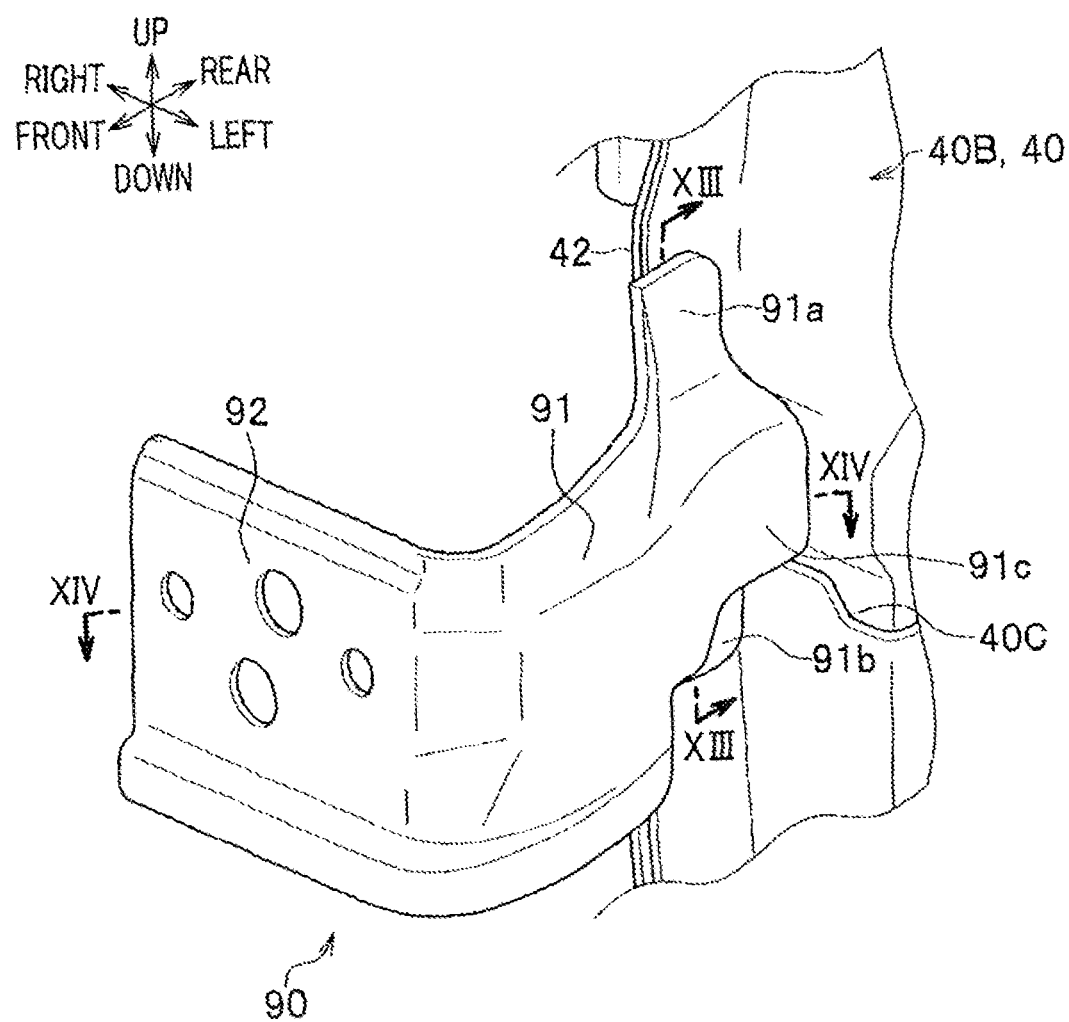
FIG. 12 is an enlarged perspective view of a second load transmission member.

As shown in FIG. 12, the second load transmission member 90 is a member for transmitting collision load applied in the event of collision of the vehicle 10 to the upper vertical member 40B. The second load transmission member 90 is formed into a predetermined complex shape by making bends and notches in a metal plate. The second load transmission member 90 is provided at the lower end (near the boundary part 40C) of the upper vertical member 40B. The second load transmission member 90 protrudes toward the front of the vehicle beyond the upper vertical member 40B. The second load transmission member 90 is disposed behind the front bumper beam 13 in the vehicle front-rear direction (see FIG. 7). More specifically, the second load transmission member 90 is disposed at a position pushed toward the rear of the vehicle by the front bumper beam 13 retreated in the event of collision.

The second load transmission member 90 includes: a hat section part 91 extending in the vehicle front-rear direction and up-down direction; and a mounting seat surface 92 extending inward in the vehicle width direction from a front edge of the hat section part 91. The second load transmission member 90 has an approximately L-shape in a plan view.

Figure 13:
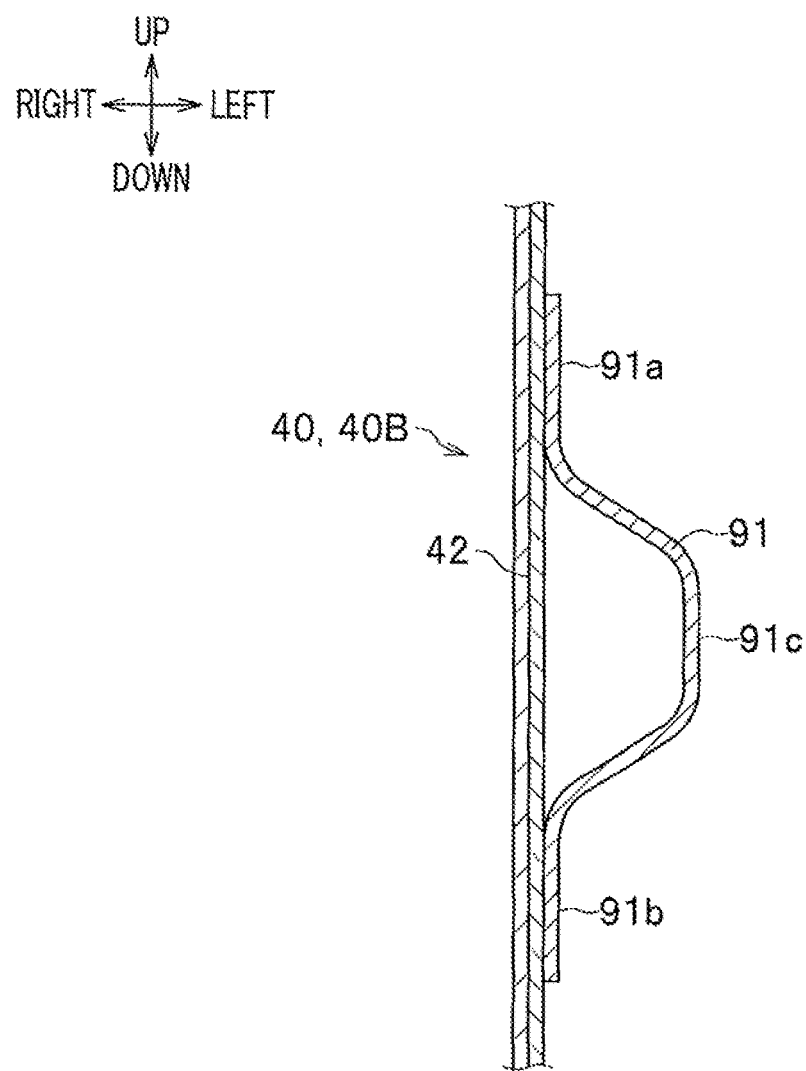
FIG. 13 is a cross-sectional view taken along the line XIII-XIII in FIG. 12.

As shown in FIG. 13, the hat section part 91 has a hat shape in a longitudinal section view along the vehicle width direction. The hat section part 91 includes: a pair of upper and lower flange portions 91*a* and 91*b* fixed to the upper vertical member 40B; and a top portion 91*c* located between the upper and lower flange portions 91*a* and 91*b* and separated toward the outer side of the vehicle from the upper vertical member 40B. The top portion 91*c* has a groove shape with an opening on the inner side of the vehicle.

Figure 14:
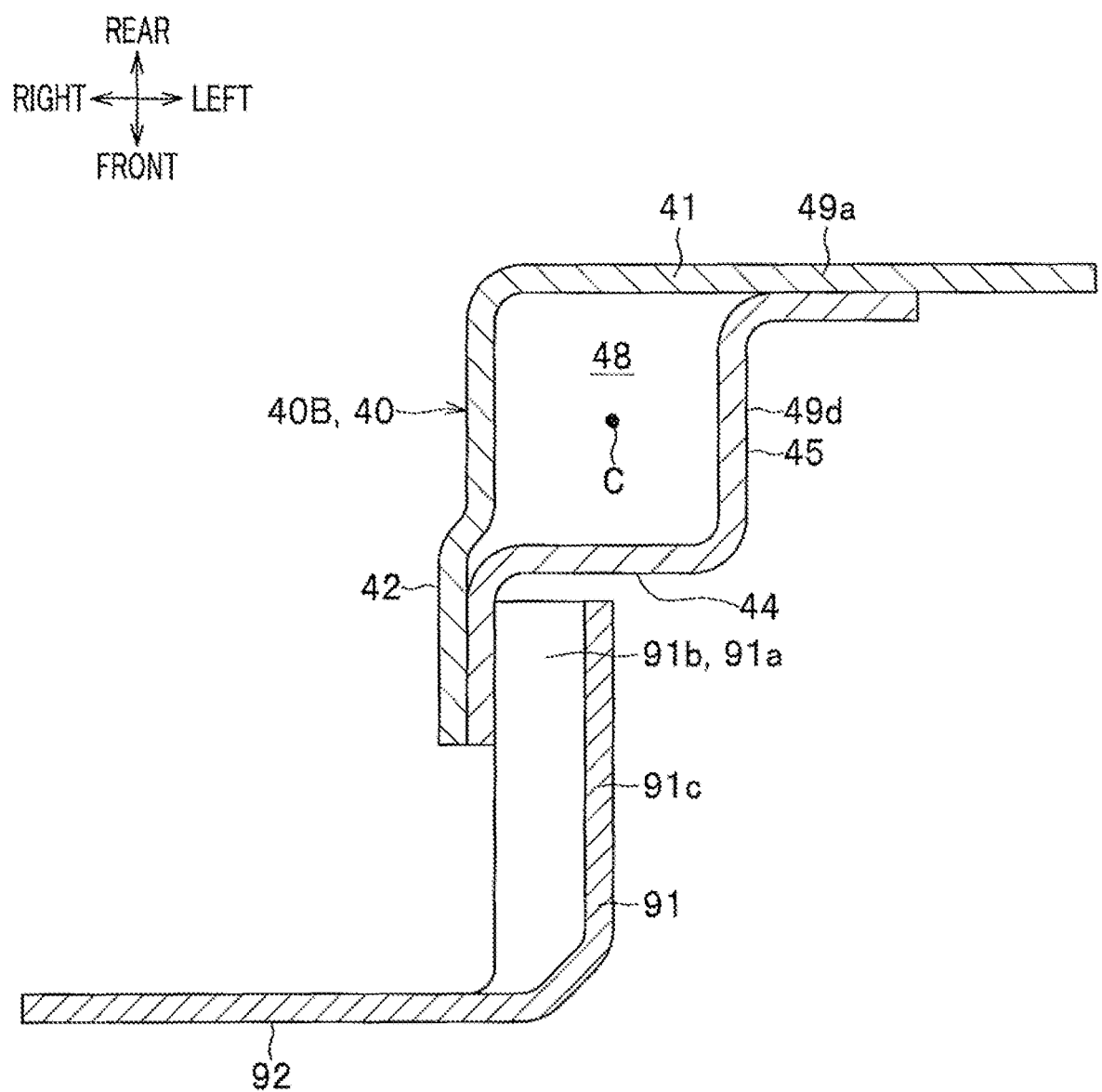
FIG. 14 is a cross-sectional view taken along the line XIV-XIV in FIG. 12.

As shown in FIG. 14, the hat section part 91 is disposed such that the top portion 91*c* faces the center C side of the hollow part 48. The top portion 91*c* is disposed at a position overlapping, in the vehicle front-rear direction, with a virtual plane along the vehicle front-rear direction passing through the center C. The upper and lower flange portions 91*a* and 91*b* are connected by welding to the vehicle inner wall 42.

The mounting seat surface 92 is a part for mounting an unillustrated radiator. The mounting seat surface 92 is formed into an approximately vertical surface extending in the vehicle width direction and in the up-down direction. The mounting seat surface 92 intersects with (in this embodiment, is orthogonal to) the hat section part 91.

Next, with reference to FIG. 15, the collision detection sensor 100 and the protector 110 will be described in detail.

Figure 15:
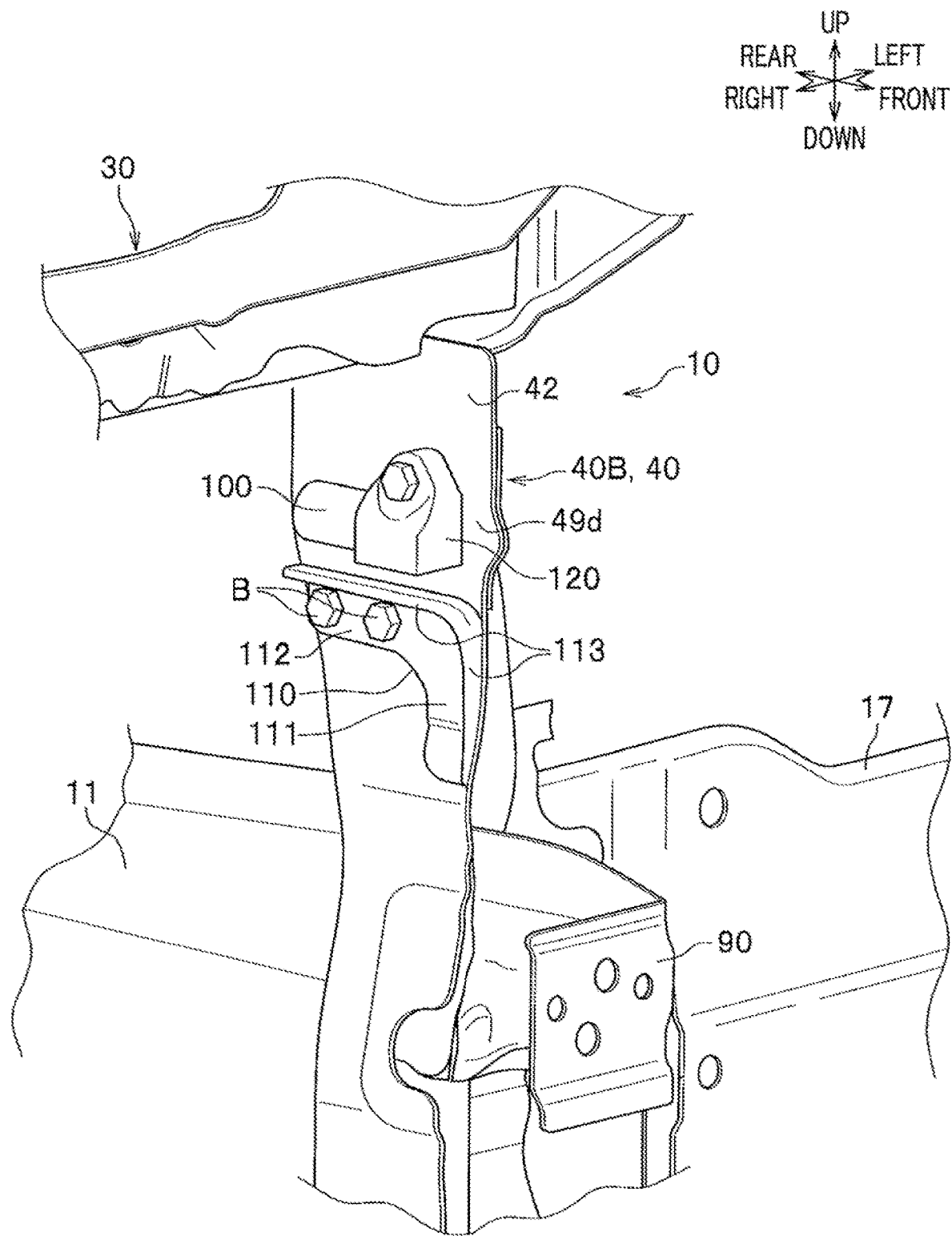
FIG. 15 is a perspective view seen from the arrow Y direction in FIG. 2.

As shown in FIG. 15, the collision detection sensor 100 is, for example, an acceleration sensor that detects collision of the vehicle 10 by moving to the rear of the vehicle to detect the acceleration. An unillustrated air bag in a vehicle interior is configured to inflate based on the acceleration detected by the collision detection sensor 100. The collision detection sensor 100 is fixed to the vehicle inner wall 42 on the upper vertical member 40B side through a bracket 120. The collision detection sensor 100 is disposed above the second load transmission member 90.

The protector 110 is fixed to the vehicle inner wall 42 on the upper vertical member 40B side at a position near and below the collision detection sensor 100. The protector 110 is formed into a predetermined complex shape by making bends and notches in a metal plate. The protector 110 has an L-shape in a side view. The protector 110 is located in front of the collision detection sensor 100 in the vehicle front-rear direction. The protector 110 is configured to be able to come into contact with the vehicle body front part damaged in the event of collision before the collision detection sensor 100.

The protector 110 includes: a protector longitudinal wall 111 extending in the vehicle front-rear direction and up-down direction; and a protector traverse wall 112 extending toward the rear of the vehicle from an upper edge of the protector longitudinal wall 111 and extending in the front-rear direction and up-down direction. The protector traverse wall 112 is connected to the vehicle inner wall 42 on the upper vertical member 40B side with a plurality of (two in this embodiment) bolts B, B lined up in the front-rear direction. At a front edge of the protector longitudinal wall 111 and an upper edge of the protector traverse wall 112, folded-back parts 113 are formed by folding back the edges to improve the stiffness. The folded-back parts 113 extend in a direction (inward in the vehicle width direction) perpendicular to the front edge of the protector longitudinal wall 111 and the protector traverse wall 112. Note that the protector 110 may be provided at a position near and above the collision detection sensor 100.

The vehicle 10 to which the vehicle body front part structure according to this embodiment is applied basically has the above configuration. Next, advantageous effects thereof will be described.

Figure 16:
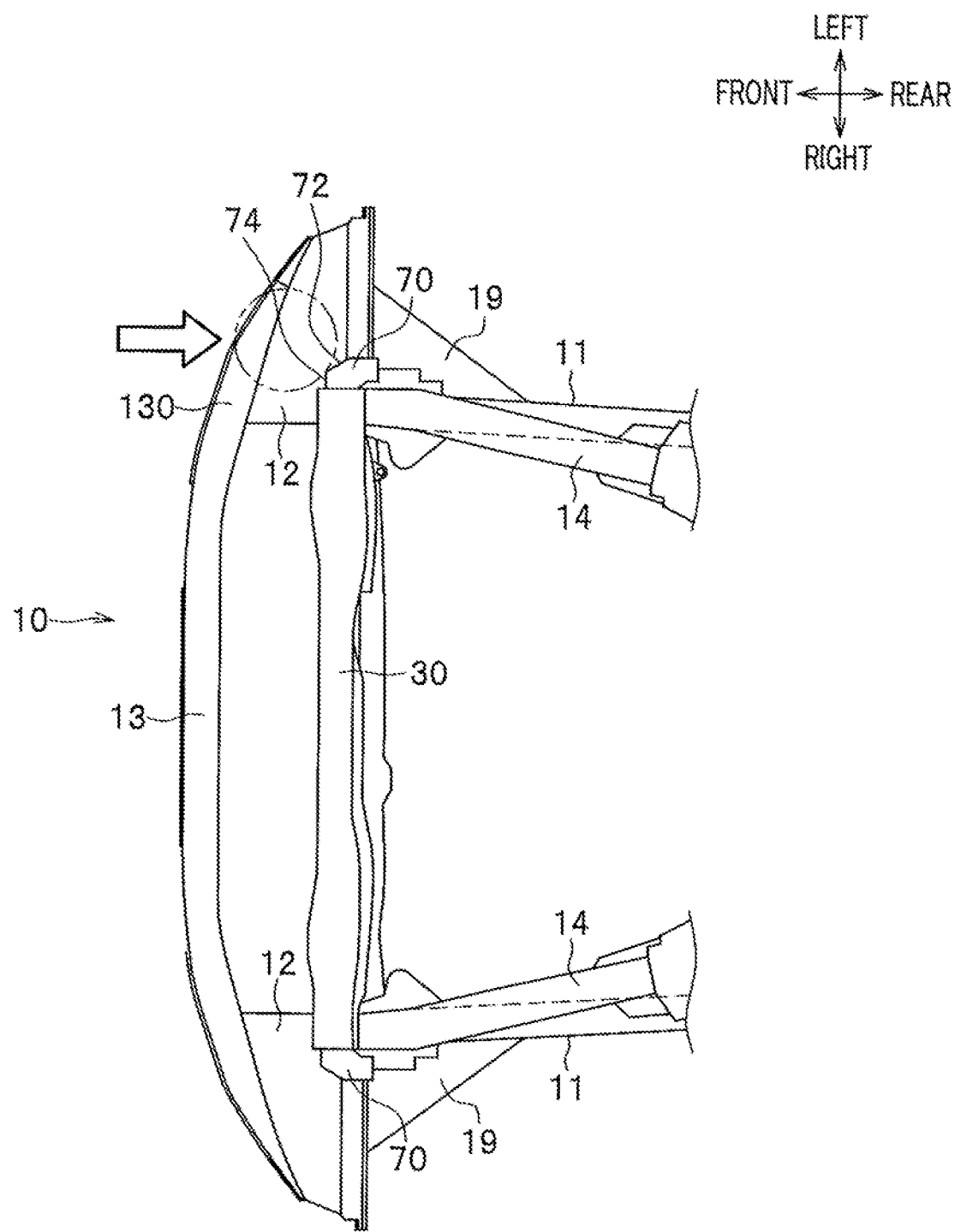
FIG. 16 is a bottom view showing a state in the event of small overlap collision with a utility pole.
Figure 17:
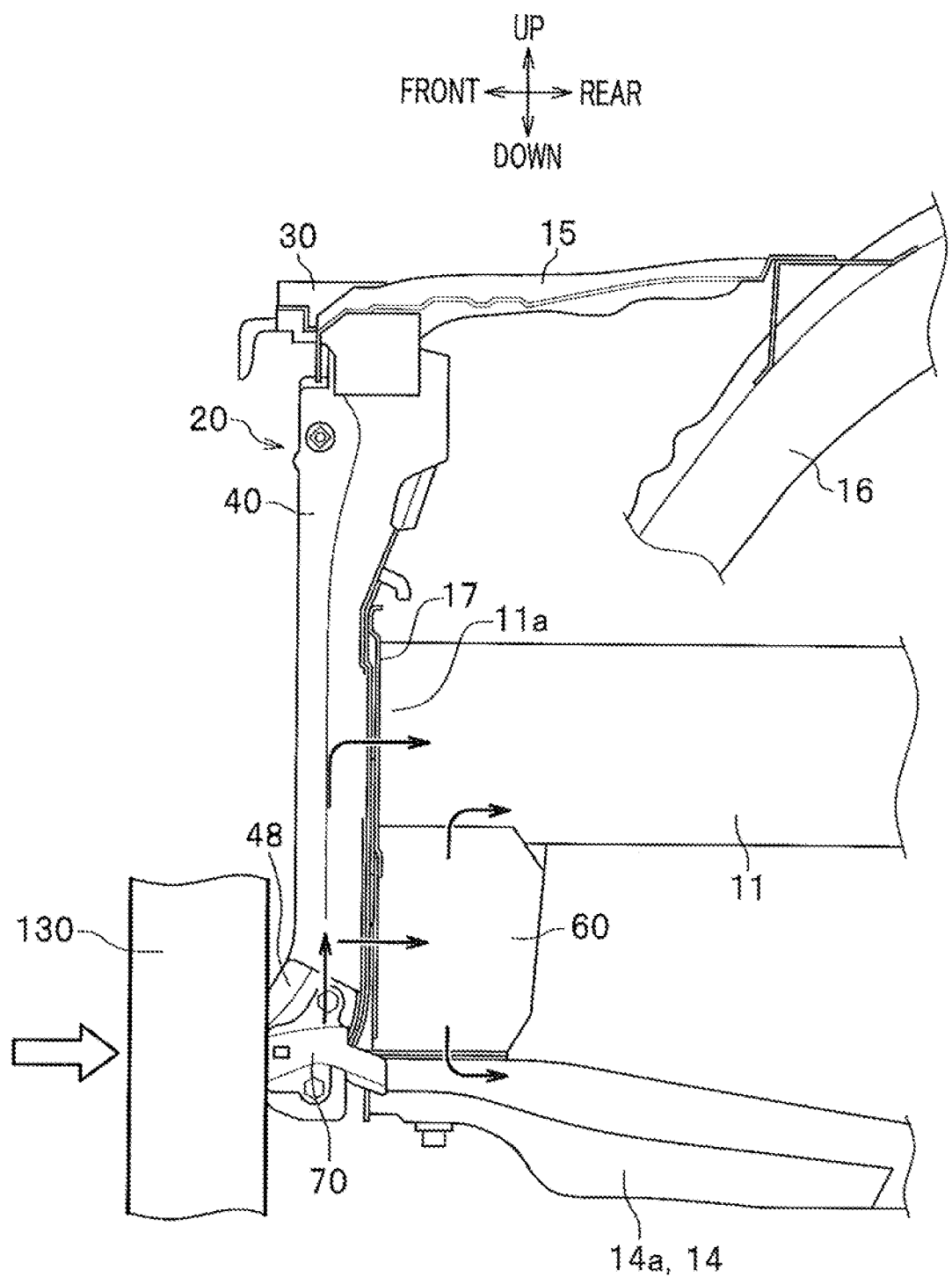
FIG. 17 is a left side view schematically showing a transmission path of collision load in the event of small overlap collision.

FIG. 16 is a bottom view showing a state of the vehicle 10 to which the vehicle body front part structure according to the embodiment of the present invention in the event of small overlap collision with a utility pole 130. FIG. 17 is a side view schematically showing a transmission path of collision load in the event of small overlap collision.

As shown in FIG. 16, in the event of small overlap collision of the vehicle 10 according to this embodiment with the utility pole 130 that is a collision object, the utility pole 130 collides with the first load transmission member 70, and the first load transmission member 70 is pushed rearward by the utility pole 130. In this event, the utility pole 130 comes into contact with the front end 74 and the inclined surface 72 of the first load transmission member 70.

Then, as shown in FIG. 17, collision load is transmitted to the vertical member 40 through the forward extension part 46 connected to the first load transmission member 70. The collision load transmitted to the vertical member 40 is transmitted to the front side frame 11.

The collision load is also transmitted to the supporting member 60 connected to the vertical member 40. The collision load transmitted to the supporting member 60 is transmitted to the front side frame 11 located above and the front subframe 14 located below, respectively.

Thereafter, the front side frame 11 is deformed (bendingly deformed or axially collapsed) by the collision load, and such deformation absorbs collision energy.

According to this embodiment described above, the vertical member 40 of the front bulkhead 20 is connected to the front end 11a of the front side frame 11, and the forward extension part 46 extending toward the front of the vehicle is provided at the lower end of the vertical member 40. Also, the first load transmission member 70 is fixed to the forward extension part 46. Therefore, the first load transmission member 70 is disposed closer to the front of the vehicle than the front side frame 11. Accordingly, in the event of small overlap collision, the collision object hits against the first load transmission member 70 sooner than the conventional technology in which the front side frame 11 and the first load transmission member 70 are located at the same position in the vehicle front-rear direction. Therefore, the collision load can be transmitted promptly to the front side frame 11. As a result, the front side frame 11 can be promptly deformed, and the collision energy can be quickly absorbed.

Moreover, according to this embodiment, the first load transmission member 70 includes the front end 74 and the inclined surface 72 that is continuous with the lateral side, in the vehicle width direction, of the front end and is inclined outward in the vehicle width direction from front to rear of the vehicle. Thus, the front end 74 and the inclined surface 72 can come into contact with the collision object. Accordingly, a contact area can be increased, and thus the collision load can be favorably transmitted to the front side frame 11.

Moreover, according to this embodiment, the locking part 77 of the first load transmission member 70 is located on the outer side, in the vehicle width direction, of the front end 14b of the longitudinal frame 14a. Thus, the front end 14b of the longitudinal frame 14a can be prevented from opening outward in the vehicle width direction in the event of full flat collision.

Moreover, according to this embodiment, the upper and lower flanges 75 and 76 of the first load transmission member 70 are fixed to the vehicle outer wall 45 at the lower end of the vertical member 40, and the joining flange 32f of the lateral member 30 is fixed to the vehicle inner wall 42 at the lower end of the vertical member 40. Therefore, since the outer and inner surfaces of the vertical member 40 both have the flanges fixed thereto, stiffness balance therebetween is equalized. This makes it unlikely for the vertical member 40 to collapse in the event of small overlap collision. As a result, the collision load can be favorably transmitted to the front side frame 11.

Moreover, according to this embodiment, the lower end of the vertical member 40 is inserted into the open section part 33 of the lateral member 30 and fixed therein. Thus, the stiffness of the lower end of the vertical member 40, which serves as the fixing part for the first load transmission member 70, can be improved. This makes it unlikely for the vertical member 40 to collapse in the event of small overlap collision. As a result, the collision load can be favorably transmitted to the front side frame 11.

Moreover, according to this embodiment, the bulging part 62 bulging toward the front of the vehicle along the rear surface of the forward extension part 46 is formed in the front wall 61 of the supporting member 60 located behind the forward extension part 46. Thus, when a foot sweep member for a pedestrian's leg is provided on the front surface of the lower end of the vertical member 40 or the front surface of the lateral member 30 therebelow, load from the foot sweep member can be quickly supported.

Moreover, according to this embodiment, the vertical member 40 includes the hollow part 48 that is continuous in the up-down direction. Thus, the strength and stiffness of the vertical member 40 can be improved.

The vehicle body mounting seat 47 is formed such that the central part, in the up-down direction, of the hollow part 48 is biased inward in the vehicle width direction. Thus, the bumper beam extension 12 can be installed at the front ends 11a of the front side frames 11 with the vehicle body mounting seat 47 sandwiched therebetween.

Accordingly, the first load transmission member 70 can be disposed on the outer side in the vehicle width direction than the front side frame 11 to deal with the small overlap collision while securing the installation space for the bumper beam extension 12. Moreover, the front bulkhead 20 can be assembled to the front side frames 11 from the front of the vehicle, and thus assembly workability is improved.

Moreover, according to this embodiment, the intercooler mounting bracket 80 is fixed to the main body front flange 31d and the main body front wall 31b adjacent to the main body front flange 31d, respectively. Thus, the connection between the main body front flange 31d and the main body front wall 31b can be improved. At the same time, the stiffness of the intercooler mounting bracket 80 itself can also be improved because of its bracket shape that can be fixed to the main body front flange 31d and the main body front wall 31b. Accordingly, idling vibration transmitted through an intercooler can be suppressed.

Although the embodiment of the present invention has been described in detail above with reference to the drawings, the present invention is not limited thereto but may be changed as appropriate without departing from the spirit of the invention.

Although the vertical member 40 includes the six plate bodies 49a to 49f in this embodiment, the number of the plate bodies included in the vertical member 40 may be increased or decreased as appropriate.

Although the hollow part 48 is formed into the square cylindrical shape in this embodiment, the hollow part 48 may be formed into a polygonal cylindrical shape other than a cylindrical shape and the square cylindrical shape, for example.

REFERENCE SIGNS LIST

10 Vehicle (Vehicle body front part structure)
1 Front side frame
11 Front side frame
11a Front end
14 Front subframe
14a Longitudinal frame
20 Front bulkhead
30 Lateral member
31 Main body member
31b Main body front wall (Vertical part)
31d Main body front flange
32 Cover member
32f Joining flange (Second joining flange)
33 Open section part
40 Vertical member
46 Forward extension part
47 Vehicle body mounting seat
48 Hollow part
60 Supporting member
61 Front wall
62 Bulging part
70 First load transmission member
72 Inclined surface
74 Front end
75 Upper flange (First joining flange)
76 Lower flange (First joining flange)
77 Locking part
80 Intercooler mounting bracket

The invention claimed is:

1. A vehicle body front part structure comprising:
a pair of left and right front side frames extending in a vehicle front-rear direction; and
a front bulkhead connected to front ends of the front side frames,
wherein the front bulkhead includes a pair of upper and lower lateral members extending in a left-right direction and a pair of left and right vertical members extending in an up-down direction so as to connect ends on outer sides in a vehicle width direction of the lateral members to each other,
the vertical members are hollow members and have forward extension parts formed to allow lower ends of the vertical members to extend outward in the vehicle width direction and to allow the lower ends of the vertical members to be curved to extend toward a front side of the vehicle,
the lower ends of the vertical members are each supported by a supporting member from a rear side of the vehicle, and load transmission members located on more outer sides in the vehicle width direction than the front side frames are fixed to vehicle outer walls of the forward extension parts.

2. The vehicle body front part structure according to claim 1, wherein the load transmission members each include a front end and an inclined surface that is continuous, on the outer side in the vehicle width direction, with the front end, and is inclined outward in the vehicle width direction from front to rear of the vehicle.

3. The vehicle body front part structure according to claim 1, further comprising:
front subframes disposed below the front side frames and disposed behind the load transmission members,
wherein the front subframes include a pair of left and right longitudinal frames extending in the vehicle front-rear direction, and
the load transmission members include locking parts located on outer sides in the vehicle width direction of front ends of the longitudinal frames.

4. The vehicle body front part structure according to claim 3, wherein
first joining flanges fixed to side walls on outer sides in the vehicle width direction of the vertical members are formed in the load transmission members, and
second joining flanges fixed to side walls on inner sides in the vehicle width direction of the vertical members are formed at the ends on the outer sides in the vehicle width direction of the lateral members.

5. The vehicle body front part structure according to claim 4, wherein the vertical members have lower ends inserted into and fixed to the ends on the outer sides in the vehicle width direction of the lateral members.

6. The vehicle body front part structure according to claim 3, further comprising:

supporting members configured to support front ends of the front subframes with respect to lower surfaces of the front ends of the front side frames and located behind the forward extension parts,
wherein bulging parts bulging toward the front of the vehicle along rear surfaces of the forward extension parts are formed on front walls of the supporting members.

7. The vehicle body front part structure according to claim 6, wherein
the vertical members each include a hollow part that is continuous in the up-down direction,
a central part in the up-down direction of the hollow part is disposed while being biased inward in the vehicle width direction, and
a vehicle body mounting seat attached to the front end of the front side frame is formed on an outer side in the vehicle width direction of the central part.

8. The vehicle body front part structure according to claim 7, further comprising:
an intercooler mounting bracket fixed to the lower lateral member,
wherein the lower lateral member is a hollow member including a main body member having a hat shape in cross section with a top opening and a cover member covering the top opening of the main body member, and
the intercooler mounting bracket is fixed to a flange part of the main body member and a vertical part adjacent to the flange part, respectively.

9. The vehicle body front part structure according to claim 2, further comprising:
front subframes disposed below the front side frames and disposed behind the load transmission members,
wherein the front subframes include a pair of left and right longitudinal frames extending in the vehicle front-rear direction, and
the load transmission members include locking parts located on outer sides in the vehicle width direction of front ends of the longitudinal frames.

10. The vehicle body front part structure according to claim 9, wherein
first joining flanges fixed to side walls on outer sides in the vehicle width direction of the vertical members are formed in the load transmission members, and
second joining flanges fixed to side walls on inner sides in the vehicle width direction of the vertical members are formed at the ends on the outer sides in the vehicle width direction of the lateral members.

11. The vehicle body front part structure according to claim 10, wherein the vertical members have lower ends inserted into and fixed to the ends on the outer sides in the vehicle width direction of the lateral members.

12. The vehicle body front part structure according to claim 9, further comprising:
supporting members configured to support front ends of the front subframes with respect to lower surfaces of the front ends of the front side frames and located behind the forward extension parts,
wherein bulging parts bulging toward the front of the vehicle along rear surfaces of the forward extension parts are formed on front walls of the supporting members.

13. The vehicle body front part structure according to claim 12, wherein
the vertical members each include a hollow part that is continuous in the up-down direction,
a central part in the up-down direction of the hollow part is disposed while being biased inward in the vehicle width direction, and
a vehicle body mounting seat attached to the front end of the front side frame is formed on an outer side in the vehicle width direction of the central part.

14. The vehicle body front part structure according to claim 13, further comprising:
an intercooler mounting bracket fixed to the lower lateral member,
wherein the lower lateral member is a hollow member including a main body member having a hat shape in cross section with a top opening and a cover member covering the top opening of the main body member, and
the intercooler mounting bracket is fixed to a flange part of the main body member and a vertical part adjacent to the flange part, respectively.

\* \* \* \* \*